US009887599B2

(12) United States Patent
Sakaue et al.

(10) Patent No.: US 9,887,599 B2
(45) Date of Patent: Feb. 6, 2018

(54) STATOR FOR ROTARY ELECTRIC MACHINE

(71) Applicant: Mitsubishi Electric Corporation, Chiyoda-ku, Tokyo (JP)

(72) Inventors: Atsushi Sakaue, Tokyo (JP); Akira Hashimoto, Tokyo (JP); Hiroyuki Akita, Tokyo (JP); Hironori Tsuiki, Tokyo (JP); Masaya Inoue, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 315 days.

(21) Appl. No.: 14/781,117

(22) PCT Filed: Oct. 24, 2013

(86) PCT No.: PCT/JP2013/078829
§ 371 (c)(1),
(2) Date: Sep. 29, 2015

(87) PCT Pub. No.: WO2014/162626
PCT Pub. Date: Oct. 9, 2014

(65) Prior Publication Data
US 2016/0056679 A1     Feb. 25, 2016

(30) Foreign Application Priority Data

Apr. 2, 2013   (JP) .................................. 2013-076954

(51) Int. Cl.
*H02K 3/28* (2006.01)
*H02K 1/16* (2006.01)
(Continued)

(52) U.S. Cl.
CPC ................. *H02K 3/28* (2013.01); *H02K 1/16* (2013.01); *H02K 3/12* (2013.01); *H02K 3/34* (2013.01);
(Continued)

(58) Field of Classification Search
CPC .. H02K 1/16; H02K 3/12; H02K 3/28; H02K 15/0435; H02K 15/066; H02K 3/34; H02K 15/024
See application file for complete search history.

(56) References Cited

U.S. PATENT DOCUMENTS 5,926,940 A * 7/1999 Toh ...................... H02K 15/045
29/596
8,264,115 B2   9/2012 Nakamura
(Continued)

FOREIGN PATENT DOCUMENTS

JP   2004-236388 A   8/2004
JP   2007-288848 A   11/2007
(Continued)

OTHER PUBLICATIONS

International Search Report (PCT/ISA/210) dated Jan. 28, 2014, by the Japanese Patent Office Patent Office as the International Searching Authority for International Application No. PCT/JP2013/078829.

*Primary Examiner* — Mohamad Musleh
(74) *Attorney, Agent, or Firm* — Buchanan Ingersoll & Rooney PC

(57) ABSTRACT

A stator winding includes forty-eight winding bodies 22 that are each produced by winding a jointless continuous conductor wire that is coated with insulation, and that are arranged at a pitch of one slot in a circumferential direction so as to be mounted into a first slot $13_1$, a second slot $13_2$, and a third slot $13_3$ that are circumferentially consecutive at an angular spacing of six slots. The winding bodies 22 are (Continued)

configured into a δ-shaped coil pattern that is formed by inserting the conductor wire 19 sequentially into the first slot 13₁, the second slot 13₂, the third slot 13₃, and the second slot 13₂, so as to alternate an axial direction of insertion into the first slot 13₁, the second slot 13₂, and the third slot 13₃.

9 Claims, 27 Drawing Sheets

(51) Int. Cl.
*H02K 3/12* (2006.01)
*H02K 15/04* (2006.01)
*H02K 15/06* (2006.01)
*H02K 3/34* (2006.01)
*H02K 15/02* (2006.01)

(52) U.S. Cl.
CPC ....... *H02K 15/0435* (2013.01); *H02K 15/066* (2013.01); *H02K 15/024* (2013.01)

(56) References Cited

U.S. PATENT DOCUMENTS

| | | |
|---|---|---|
| 2008/0231136 A1 | 9/2008 | Obata |
| 2009/0121575 A1 | 5/2009 | Wolf |
| 2011/0133593 A1 | 6/2011 | Nakamura |
| 2013/0014381 A1* | 1/2013 | Kayukawa ............... H02K 3/28 29/596 |

FOREIGN PATENT DOCUMENTS

| | | |
|---|---|---|
| JP | 2008-236924 A | 10/2008 |
| JP | 2009-522991 A | 6/2009 |
| JP | 2011-142798 A | 7/2011 |
| JP | 2012-110077 A | 6/2012 |
| JP | 2012-125043 A | 6/2012 |
| JP | 2012-165625 A | 8/2012 |

* cited by examiner

STATOR FOR ROTARY ELECTRIC MACHINE

TECHNICAL FIELD

The present invention relates to a stator for a rotary electric machine such as an electric motor or a generator, for example, and particularly relates to a stator winding construction.

BACKGROUND ART

In recent years, compactness and high output have been required in rotary electric machines such as electric motors or generators. With regard to downsizing rotary electric machines of this kind, stator windings that have concentrated windings in which conductor wires are wound onto individual stator core teeth have been used with a view to downsizing coil ends that do not generate effective magnetic flux. However, stators that use stator windings of distributed winding construction that can suppress torque pulsation and increase output are also in demand.

Now, in contrast to concentrated windings, which are configured by winding conductor wires onto individual teeth, windings that are configured by winding conductor wires into slots that are separated by greater than or equal to two slots are called "distributed windings". In other words, distributed windings are wound such that a conductor wire that extends outward from one slot spans two or more consecutive teeth and enters another slot.

In conventional rotary electric machines such as that described in Patent Literature 1, winding coils that are molded into a coil shape by winding for a plurality of times a conductor wire that is coated with insulation, also known as "hexagonal coils", are housed in respective pairs of slots that are separated by a plurality of slots to constitute a distributed winding stator winding. Vertex portions of coil end portions are formed into crank shapes so as to be offset by an entire width of the conductor wire that is wound for a plurality of times such that the hexagonal coils are housed in an inner layer side of a first slot and an outer layer side of a second slot, and an insulating layer is applied to the coil end portions to ensure interphase insulation.

In conventional rotary electric machines such as that described in Patent Literature 2, winding groups that are formed by arranging at a pitch of one slot windings in which conductor wires are inserted into respective slots that are separated by a plurality of slots in a circumferential direction so as to be mounted in a wave shape are disposed in multiple layers radially to form a distributed-winding stator winding. A thick insulating coating is coated onto the conductor wire, or insulating papers are disposed between the conductor wire, to ensure interphase insulation.

CITATION LIST

Patent Literature

Patent Literature 1: Japanese Patent Laid-Open No. 2008-236924 (Gazette)
Patent Literature 2: Japanese Patent Laid-Open No. 2011-142798 (Gazette)

SUMMARY OF THE INVENTION

Problem to be Solved by the Invention

In Patent Literature 1, because interphase insulation is ensured by applying an insulating layer to the coil end portions that constitute an assembly of return portions, increases in diameter of the coil ends that result from interphase insulation can be suppressed. However, because the hexagonal coils are lane-changed at the vertex portions of the coil end portions so as to be offset by an entire width of the coil end portions that constitute the assembly of return portions, the bending radius of the vertex portions of the coil end portions is increased, increasing the diameter of the coil ends, and one problem has been that the coil ends extend axially.

In Patent Literature 2, because the stator winding is an assembly of wave windings, the bending radius of the return portions is reduced, enabling increases in dimensions of the coil ends that result from lane changing to be suppressed. However, because the wave windings are disposed in multiple layers in a radial direction, making it necessary to ensure insulation between the respective layers (interphase insulation), one problem has been that the diameter of the coil ends is increased by the interphase insulation, reducing the conductor cross-sectional area in the conductor wire.

The present invention aims to solve the above problems and an object of the present invention is to provide a compact, high-output stator for a rotary electric machine by adapting a coil shape of a distributed winding coil to suppress increases in a diameter of a coil end that result from lane changing while also suppressing increases in the diameter of the coil end that result from interphase insulation.

Means for Solving the Problem

In order to achieve the above object, according to one aspect of the present invention, there is provided a stator for a rotary electric machine including: an annular stator core in which slots are arranged circumferentially; and a stator winding that is mounted to the stator core, wherein: the stator winding includes a plurality of winding bodies that are each produced by winding a jointless continuous conductor wire that is coated with insulation, and that are arranged at a pitch of one slot in a circumferential direction so as to be mounted into a first slot, a second slot, and a third slot that line up at an angular spacing of n slots in a circumferential direction, where n is a natural number that is greater than or equal to 2. The winding bodies are configured by repeatedly winding a δ-shaped coil pattern that is formed by inserting the conductor wire sequentially into the first slot, the second slot, the third slot, and the second slot, so as to alternate an axial direction of insertion into the first slot, the second slot, and the third slot, for in turns in a radial direction, where in is a natural number that is greater than or equal to 1.

Effects of the Invention

According to the present invention, winding bodies are formed into a pattern in which a δ-shaped coil pattern is wound repeatedly for in turns in a radial direction, where m is a natural number that is greater than or equal to 1. Thus, the bending radius in coil end portions is reduced, enabling increases in the size of coil ends that result from lane changing to be suppressed. Furthermore, the winding bodies are distributed windings, suppressing torque pulsation and enabling increases in output to be achieved.

The winding bodies that are formed into the pattern in which the δ-shaped coil pattern is wound repeatedly for in turns in a radial direction are arranged at a pitch of one slot in a circumferential direction, where m is a natural number that is greater than or equal to 1. Thus, the number of intervals between radially adjacent layers in which different-phase coil end portions cross is reduced, simplifying interphase insulation, and also enabling increases in the size of the coil ends that result from interphase insulation to be suppressed.

DESCRIPTION OF EMBODIMENTS

Preferred embodiments of a rotary electric machine according to the present invention will now be explained with reference to the drawings.

Embodiment 1

Figure 1:
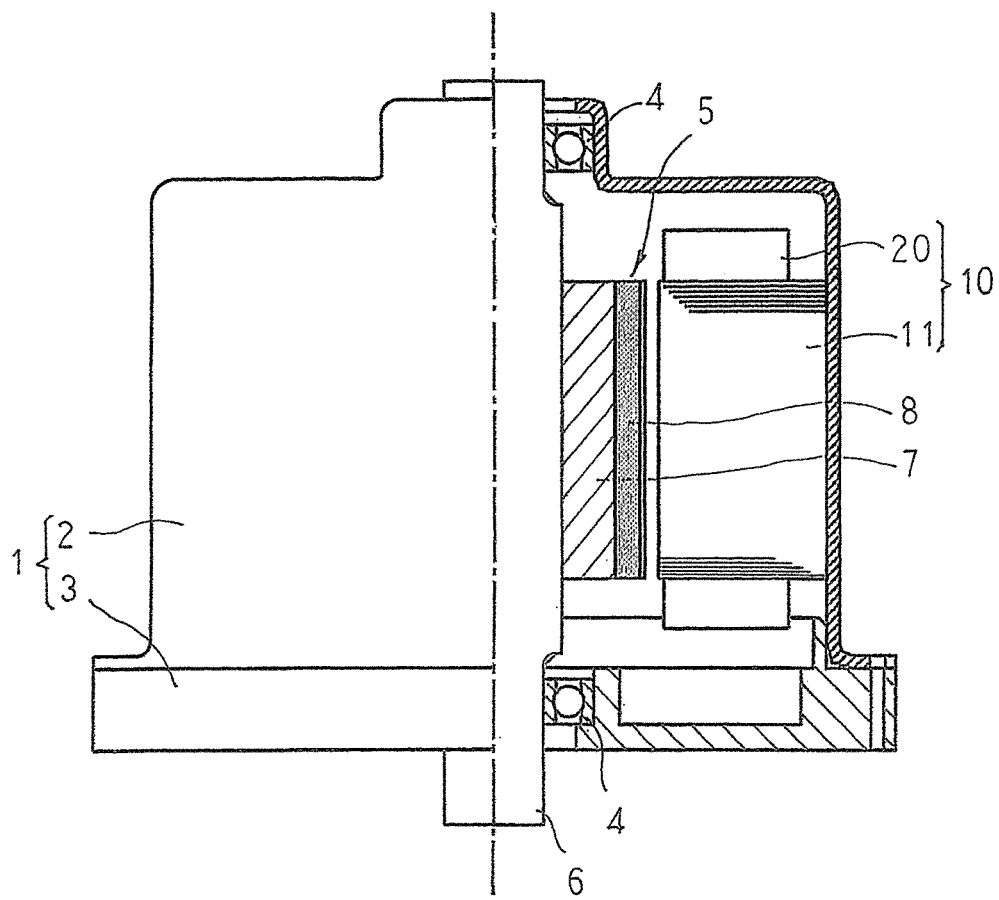
FIG. 1 is a half section that shows a rotary electric machine according to Embodiment 1 of the present invention.
Figure 2:
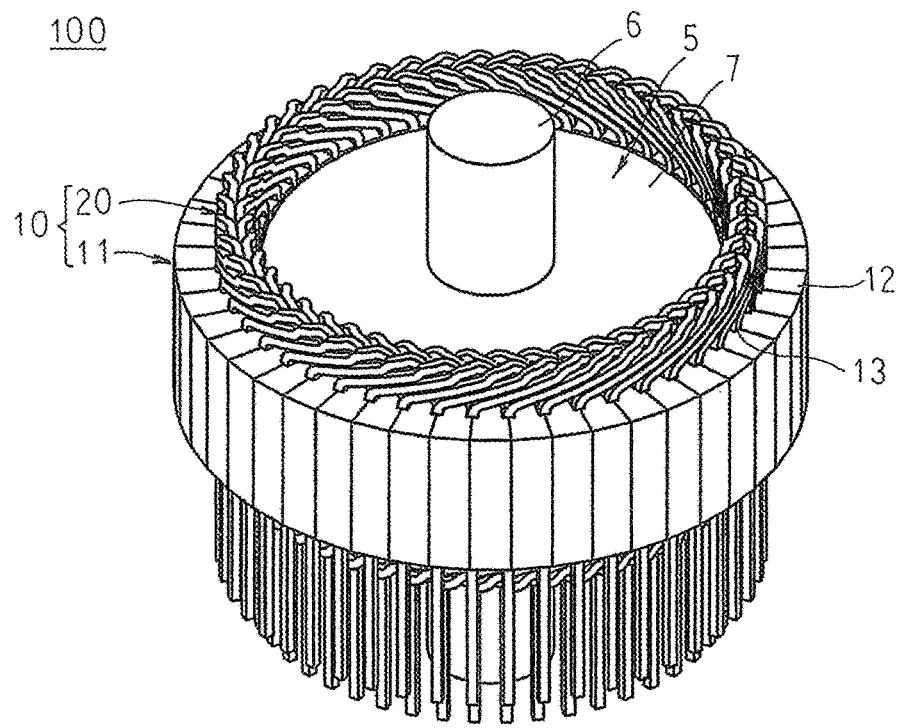
FIG. 2 is an oblique projection that shows part of the rotary electric machine according to Embodiment 1 of the present invention.
Figure 3:
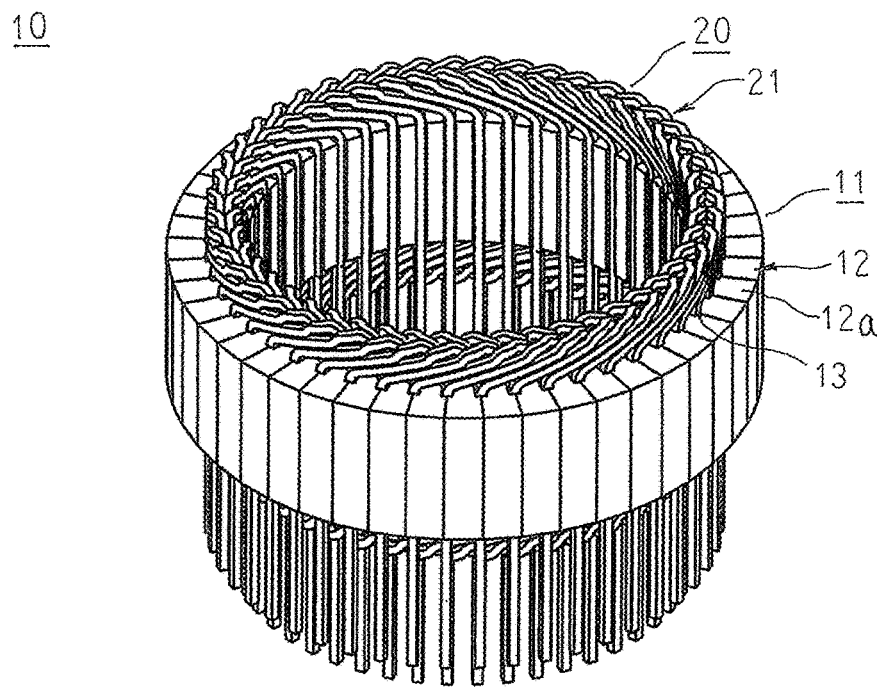
FIG. 3 is an oblique projection that shows a stator that is used in the rotary electric machine according to Embodiment 1 of the present invention.
Figure 4:
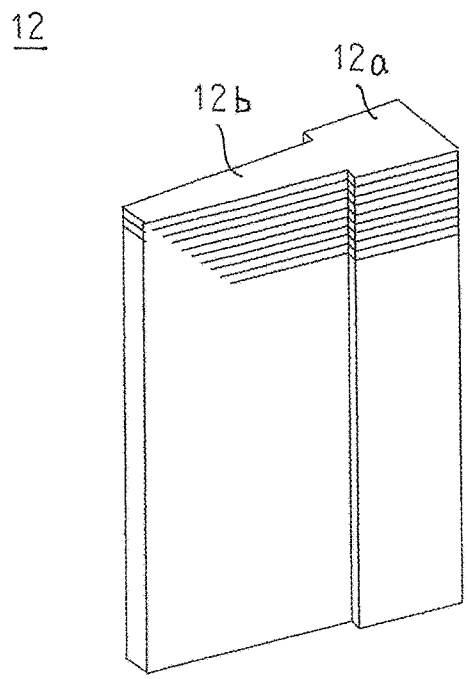
FIG. 4 is an oblique projection that shows a core block that constitutes part of a stator core that is used in the rotary electric machine according to Embodiment 1 of the present invention.
Figure 5:
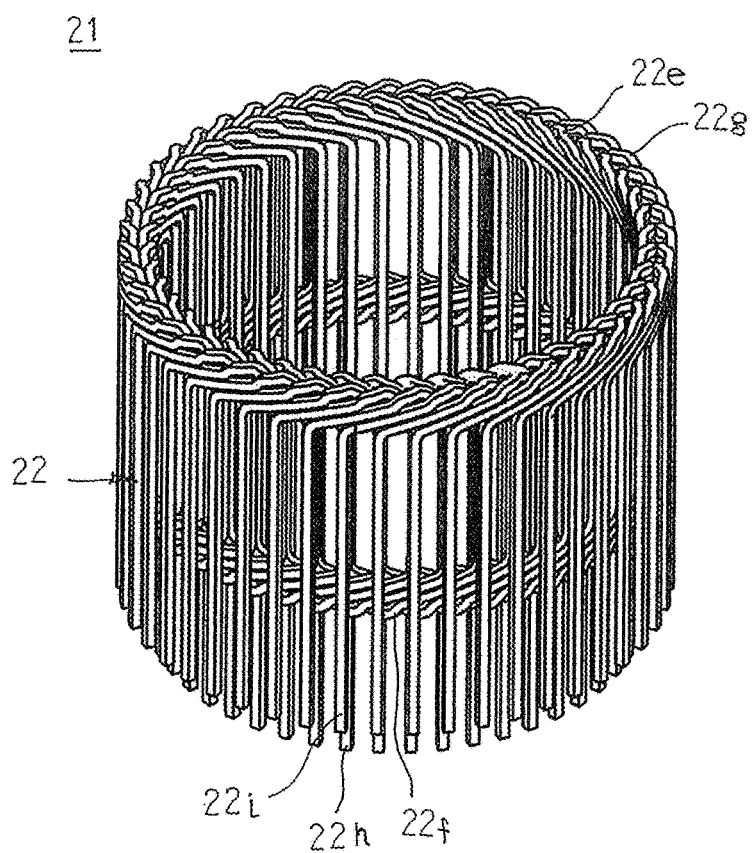
FIG. 5 is an oblique projection that shows a winding assembly that constitutes part of a stator winding of the stator that is used in the rotary electric machine according to Embodiment 1 of the present invention.
Figure 6:
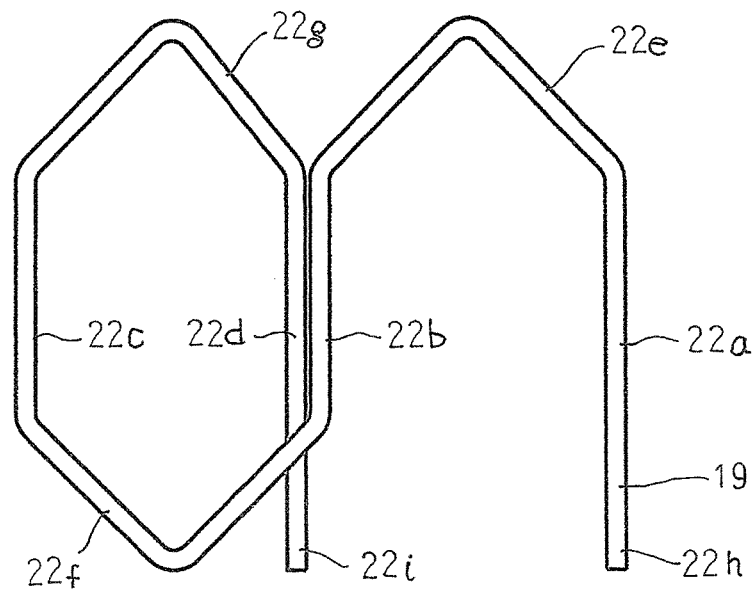
FIG. 6 is a front elevation that shows a winding body that constitutes part of the winding assembly in the rotary electric machine according to Embodiment 1 of the present invention.
Figure 7:
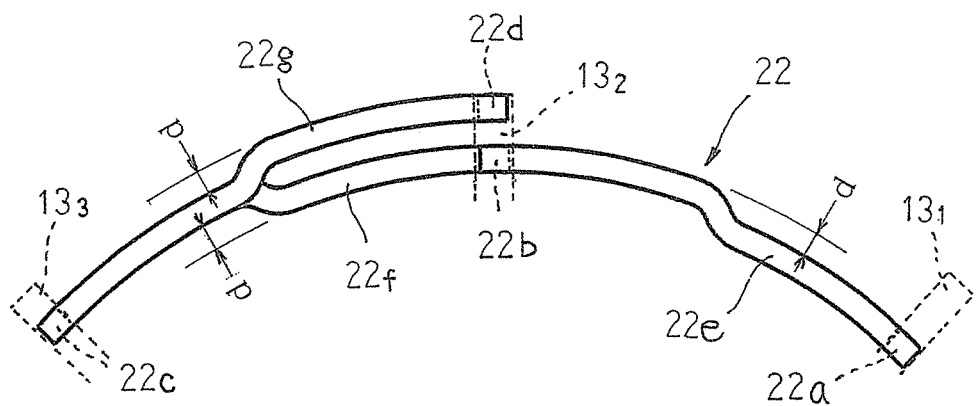
FIG. 7 is a schematic diagram of a state in which the winding body that constitutes part of the winding assembly in the rotary electric machine according to Embodiment 1 of the present invention is mounted to the stator core when viewed from a vicinity of first coil ends.
Figure 8:
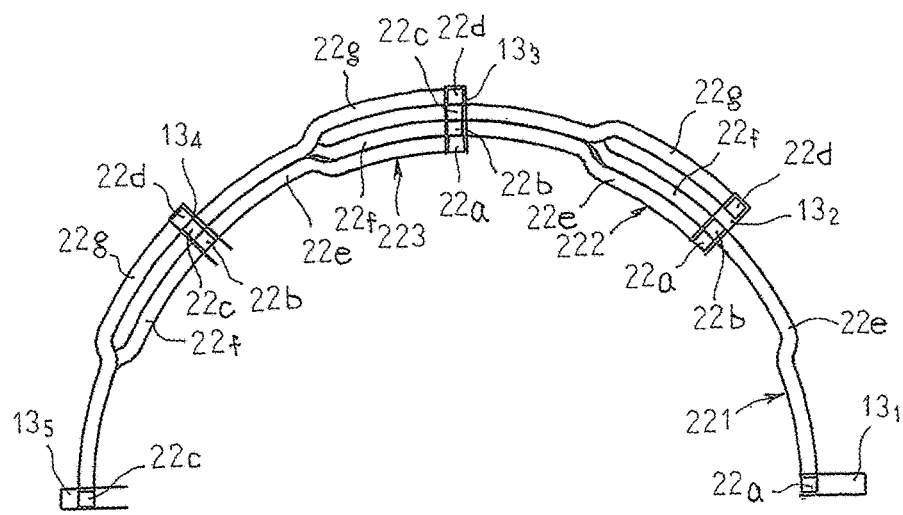
FIG. 8 is a partial end elevation of a state in which three winding bodies are mounted into the stator core so as to share a single slot in the rotary electric machine according to Embodiment 1 of the present invention when viewed from the vicinity of the first coil ends.
Figure 9:
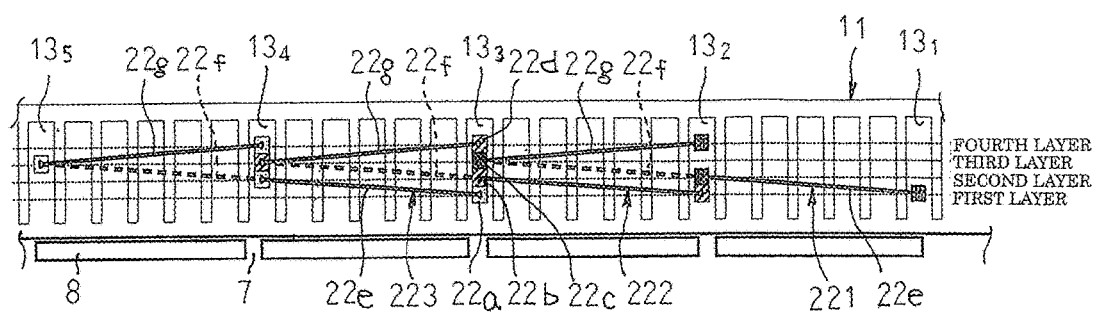
FIG. 9 is a developed projection of the state in which three winding bodies are mounted into the stator core so as to share a single slot in the rotary electric machine according to Embodiment 1 of the present invention when viewed from the vicinity of the first coil ends.
Figure 10:
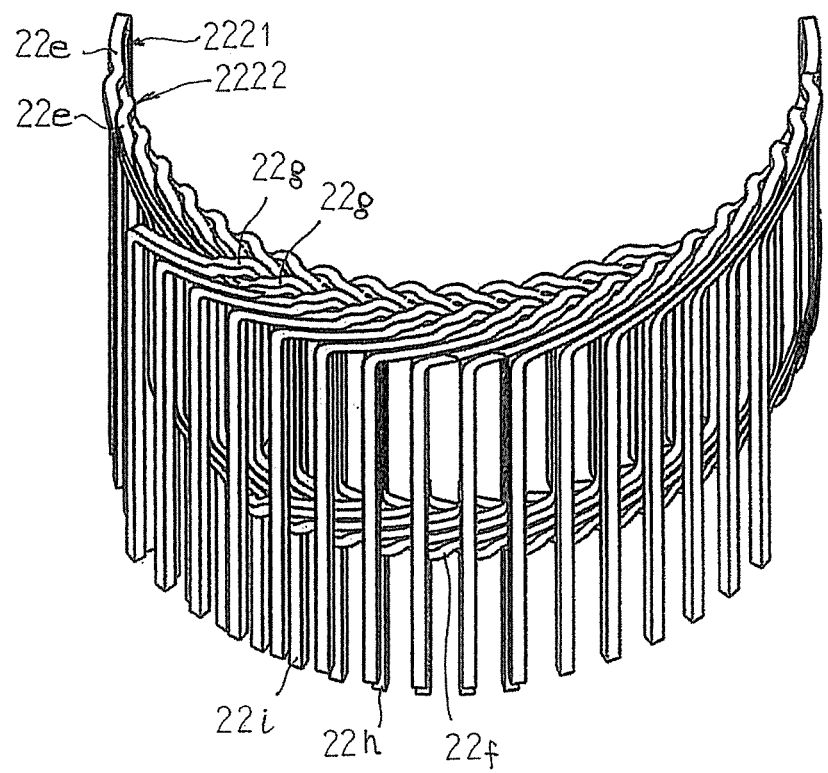
FIG. 10 is an oblique projection that shows a state in which sixteen winding bodies are arranged at a pitch of one slot in the circumferential direction in the rotary electric machine according to Embodiment 1 of the present invention.
Figure 11:
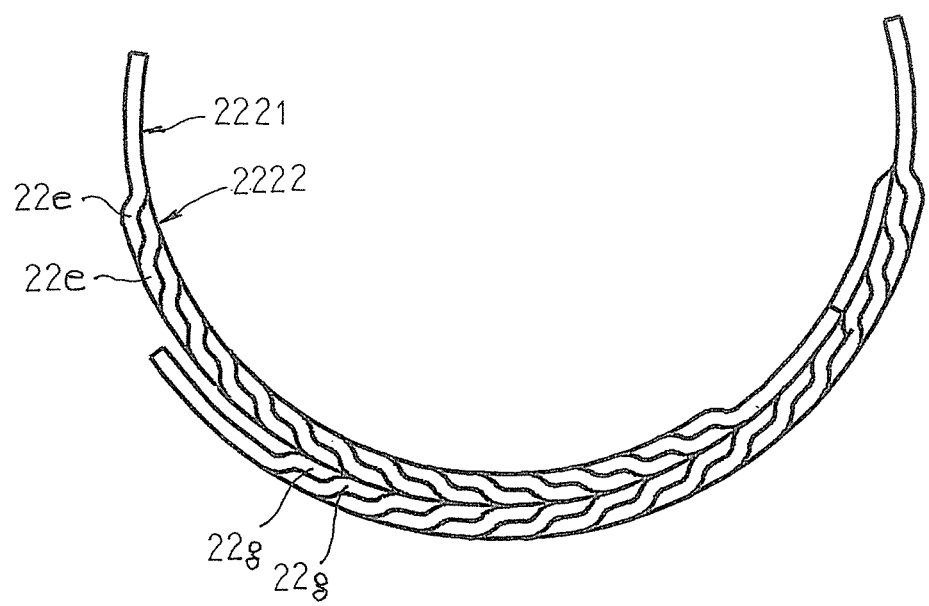
FIG. 11 is an end elevation that shows the state in which the sixteen winding bodies are arranged at a pitch of one slot in the circumferential direction in the rotary electric machine according to Embodiment 1 of the present invention when viewed from the vicinity of the first coil ends.

FIG. 1 is a half section that shows a rotary electric machine according to Embodiment 1 of the present invention, FIG. 2 is an oblique projection that shows part of the rotary electric machine according to Embodiment 1 of the present invention, FIG. 3 is an oblique projection that shows a stator that is used in the rotary electric machine according to Embodiment 1 of the present invention, FIG. 4 is an oblique projection that shows a core block that constitutes part of a stator core that is used in the rotary electric machine according to Embodiment 1 of the present invention, FIG. 5 is an oblique projection that shows a winding assembly that constitutes part of a stator winding of the stator that is used in the rotary electric machine according to Embodiment 1 of the present invention, FIG. 6 is a front elevation that shows a winding body that constitutes part of the winding assembly in the rotary electric machine according to Embodiment 1 of the present invention, FIG. 7 is a schematic diagram of a state in which the winding body that constitutes part of the winding assembly in the rotary electric machine according to Embodiment 1 of the present invention is mounted to the stator core when viewed from a vicinity of first coil ends, FIG. 8 is a partial end elevation of a state in which three winding bodies are mounted into the stator core so as to share a single slot in the rotary electric machine according to Embodiment 1 of the present invention when viewed from the vicinity of the first coil ends, FIG. 9 is a developed projection of the state in which three winding bodies are mounted into the stator core so as to share a single slot in the rotary electric machine according to Embodiment 1 of the present invention when viewed from the vicinity of the first coil ends, FIG. 10 is an oblique projection that shows a state in which sixteen winding bodies are arranged at a pitch of one slot in the circumferential direction in the rotary electric machine according to Embodiment 1 of the present invention, and FIG. 11 is an end elevation that shows a state in which sixteen winding bodies are arranged at a pitch of one slot in the circumferential direction in the rotary electric machine according to Embodiment 1 of the present invention when viewed from the vicinity of the first coil ends. Moreover, for simplicity, coil end portions are represented as straight lines in FIG. 9.

In FIGS. 1 and 2, a rotary electric machine 100 includes: a housing 1 that has: a floored cylindrical frame 2; and an end plate 3 that closes an opening of the frame 2; a stator 10 that is fixed to a cylindrical portion of the frame 2 in an internally fitted state; and a rotor 5 that is fixed to a rotating shaft 6 that is rotatably supported in the floor portion of the frame 2 and the end plate 3 by means of bearings 4 so as to be rotatably disposed on an inner circumferential side of the stator 10.

The rotor 5 is a permanent-magnet rotor that includes: a rotor core 7 that; is fixed to the rotating shaft 6, which is inserted through a central position thereof; and permanent magnets 8 that are embedded in a vicinity of an outer circumferential surface of the rotor core 7 so as to be arranged at a uniform pitch circumferentially to constitute magnetic poles. Moreover, the rotor 5 is not limited to a permanent-magnet rotor, and a squirrel-cage rotor in which uninsulated rotor conductors are housed in slots of a rotor core such that two sides are shorted by a shorting ring, or a wound rotor in which insulated conductor wires are mounted into slots of a rotor core, etc., may be used.

Next, configuration of the stator 10 will be explained in detail with reference to FIGS. 3 through 7.

As shown in FIG. 3, the stator 10 includes: a stator core 11; and a stator winding 20 that is mounted to the stator core 11. Here, to facilitate explanation, the number of poles in the rotor 5 is eight, the number of slots in the stator core 11 is forty-eight, and the stator winding 20 is a three-phase winding. In other words, the slots are formed on the stator core 11 at a ratio of two slots per phase per pole.

As shown in FIG. 4, core blocks 12 are made by dividing the annular stator core 11 into forty-eight equal sections circumferentially, and include: a core back portion 12a that has a circular arc-shaped cross section, that is produced by laminating and integrating electromagnetic steel sheets; and a tooth 12b that is disposed so as to protrude radially inward from an inner circumferential wall surface of the core back portion 12a. The stator core 11 is configured into an annular shape by arranging and integrating forty-eight core blocks 12 circumferentially by butting together circumferential side surfaces of the core back portions 12a such that the teeth 12b are oriented radially inward. The slots 13, which are formed by circumferentially adjacent core blocks 12, are arranged at a uniform angular pitch circumferentially so as to be open on an inner circumferential side. The teeth 12b are formed so as to have a tapered shape in which a circumferential width becomes gradually narrower radially inward, and a cross section of the slots 13 is oblong.

As shown in FIG. 3, the stator winding 20 is configured by applying a connection process to a winding assembly 21 that is mounted onto the stator core 11.

The winding bodies 22 are produced by winding into an edgewise winding conductor wire 19 that has an oblong cross section that is made of jointless continuous copper wire or aluminum wire that is insulated using an enamel resin, for example. Specifically, as shown in FIGS. 6 and 7, the winding bodies 21 are produced such that the conductor wire 19 is inserted into a first slot $13_1$ from a vicinity of a first end of the stator core 11, extends outward from the first slot $13_1$ at a second end of the stator core 11, is inserted from the second end of the stator core 11 into a second slot $13_2$ that is separated by an angular spacing of six slots in a first circumferential direction, extends outward from the second slot $13_2$ at the first end of the stator core 11, is inserted from the first end of the stator core 11 into a third slot $13_3$ that is separated by an angular spacing of six slots in the first circumferential direction, extends outward from the third slot $13_3$ at the second end of the stator core 11, is inserted from the second end of the stator core 11 into a second slot $13_2$ that is separated by an angular spacing of six slots in a second circumferential direction, and extends outward from the second slot $13_2$ at the first end of the stator core 11.

Moreover, an angular spacing of six slots is a spacing between slot centers of slots 13 on two sides of six consecutive teeth 12b. In FIG. 7, to facilitate explanation, slots 13 that are circumferentially consecutive at an angular spacing of six slots have been designated slot $13_1$, slot $13_2$, and slot $13_3$ in order circumferentially.

If a winding body 22 that is produced in this manner is viewed from radially inside, the conductor wire 19 is wound into a δ shape, as shown in FIG. 6. Specifically, the winding body 22 is produced by winding the conductor wire 19 into a δ-shaped coil pattern that is constituted by a first rectilinear portion 22a, a first coil end portion 22e, a second rectilinear portion 22b, a second coil end portion 22f, a third rectilinear portion 22c, a third coil end portion 22g, and a fourth rectilinear portion 22d. The second rectilinear portion 22b, which is inserted into the second slot $13_2$, is lane-changed (hereinafter "shifted") by a radial width d of the conductor wire 19 radially outward at a vertex portion of the first coil end portion 22e relative to the first rectilinear portion 22a, which is inserted into the first slot $13_1$. The third rectilinear portion 22c, which is inserted into the third slot $13_3$, is shifted by a radial width d of the conductor wire 19 radially outward at a vertex portion of the second coil end portion 22f relative to the second rectilinear portion 22b, which is inserted into the second slot $13_2$. In addition, the fourth rectilinear portion 22d, which is inserted into the second slot $13_2$, is shifted by a radial width d of the conductor wire 19 radially outward at a vertex portion of the third coil end portion 22g relative to the third rectilinear portion 22c, which is inserted into the third slot $13_3$. A winding start of the conductor wire 19 that extends outward from the first rectilinear portion 22a at a first end of the stator core 11 becomes a winding end 22h, and a winding finish of the conductor wire 19 that extends outward from the fourth rectilinear portion 22d at the first end of the stator core 11 becomes a winding end 22i.

As shown in FIG. 5, the winding assembly 21 is configured by arranging forty-eight winding bodies 22 circumferentially at a pitch of one slot. The first coil end portions 22e and the third coil end portions 22g are arranged circumferentially to constitute first coil ends, and the second coil end portions 22f are arranged circumferentially to constitute second coil ends. Winding ends 22h each project axially outward in a vicinity of the second coil ends, and are arranged on a radially inner side of the winding assembly 21 at a pitch of one slot circumferentially, and winding ends 22i each project axially outward in the vicinity of the second coil ends, and are arranged on a radially outer side of the winding assembly 21 at a pitch of one slot circumferentially.

The stator 10 is produced by mounting the winding assembly 21 to the stator core 11, and applying the connection process to the winding ends 22h and 22i. Moreover, the forty-eight winding bodies 22 that constitute part of the winding assembly 21 are each mounted into sets of three circumferentially consecutive slots 13 at an angular spacing of six slots, and are arranged at a pitch of one slot in a circumferential direction.

FIGS. 8 and 9 show a state in which three winding bodies 22 are each mounted into the stator core 11 so as to share one slot 13, and FIG. 8 shows the state in which the winding bodies 22 are mounted into the stator core when viewed from an axial direction. Here, to facilitate explanation, the five slots 13 that are circumferentially consecutive at an angular spacing of six slots will be designated a first slot $13_1$, a second slot $13_2$, a third slot $13_3$, a fourth slot $13_4$, and a fifth slot $13_5$ in circumferential order, and the three winding bodies 22 will be designated a first winding body $22_1$, a second winding body $22_2$, and a third winding body $22_3$ in circumferential order.

In the first winding body $22_1$, a first coil end 22e that extends outward at a second axial end (a vicinity of the first coil ends) from a first rectilinear portion 22a in a first layer from a slot opening side of a first slot $13_1$ extends toward a second slot $13_2$ circumferentially, is shifted radially outward at a vertex portion by a distance d, subsequently extends toward the second slot $13_2$ circumferentially, and is linked to a second rectilinear portion 22b in a second layer from a slot opening side of the second slot $13_2$. Next, a second coil end 22f that extends outward at a first axial end (a vicinity of the second coil ends) from the second rectilinear portion 22b in the second layer from the slot opening side of the second slot $13_2$ extends toward a third slot $13_3$ circumferentially, is shifted radially outward at a vertex portion by a distance d, subsequently extends toward the third slot $13_3$ circumferentially, and is linked to a third rectilinear portion 22c in a third layer from a slot opening side of the third slot $13_3$.

Next, a third coil end 22g that extends outward in the vicinity of the first coil ends from the third rectilinear portion 22c in the third layer from the slot opening side of the third slot $13_3$ extends toward the second slot $13_2$ circumferentially, is shifted radially outward at a vertex portion by a distance d, subsequently extends toward the second slot $13_2$ circumferentially, and is linked to a fourth rectilinear portion 22d in a fourth layer from the slot opening side of the second slot $13_2$.

Thus, the first rectilinear portion 22a in the first layer of the first slot $13_1$ and the second rectilinear portion 22b in the second layer of the second slot $13_2$ are linked by the first coil end 22e, the second rectilinear portion 22b in the second layer of the second slot $13_2$ and the third rectilinear portion 22c in the third layer of the third slot $13_3$ are linked by the second coil end 22f, and the third rectilinear portion 22c in the third layer of the third slot $13_3$ and the fourth rectilinear portion 22d in the fourth layer of the second slot $13_2$ are linked by the third coil end 22g, to form the δ-shaped coil pattern.

Similarly, the second winding body $22_2$ is mounted into three slots 13, i.e., the second slot $13_2$, the third slot $13_3$, and the fourth slot $13_4$, and the third winding body $22_3$ is mounted into three slots 13, i.e., the third slot $13_3$, the fourth slot $13_4$, and the fifth slot $13_5$.

Thus, the three winding bodies $22_1$, $22_2$, and $22_3$ are mounted into the stator core 11 so as to share one slot $13_3$. In the first through third coil end portions 22e, 22f, and 22g, inclined portions that extend from the end portions of the first through fourth rectilinear portions 22a, 22b, 22c, and 22d to the vertex portion are formed so as to have an approximate circular arc shape when viewed from an axial direction. The first through fourth rectilinear portions 22a, 22b, 22c, and 22d are housed in a slot $13_3$ that is shared by the three winding bodies $22_1$, $22_2$, and $22_3$ such that the longitudinal directions of the long sides of the oblong cross sections of the conductor wires are oriented circumferentially so as to line up alternately in a single column in a radial direction. The first and third coil end portions 22e and 22g are positioned radially further outward than tip end surfaces of the teeth 12b of the stator core 11, and are positioned radially further inward than bottom portions of the slots 13.

A state in which the winding bodies 22 are arranged at a pitch of one slot will now be explained with reference to FIGS. 10 and 11. FIGS. 10 and 11 show a state in which sixteen winding bodies 22 are arranged at a pitch of one slot in a circumferential direction.

In FIGS. 10 and 11, the first coil end portion 22e that extends outward from the first rectilinear portion 22a that is positioned in the first layer from a radially inner side of the winding body 2221 that is disposed at the left end extends counterclockwise circumferentially so as to pass over the first coil end 22e that extends outward from the first rectilinear portion 22a that is positioned in the first layer from a radially inner side of the winding body 2222 that is adjacent counterclockwise, is shifted at the vertex portion radially outward by a distance d, extends counterclockwise circumferentially so as to pass under the first coil end portion 22e of the winding body 2222 that is adjacent counterclockwise, and is connected to a second rectilinear portion 22b.

Although not depicted, at a rear surface in FIG. 11, the second coil end portion 22f that extends outward from the second rectilinear portion 22b of the winding body 2221 extends counterclockwise circumferentially so as to pass under the second coil end 22f that extends outward from the second rectilinear portion 22b of the winding body 2222 that is adjacent counterclockwise, emerges before the vertex portion, shifts at the vertex portion by a distance d radially outward, extends circumferentially counterclockwise so as to pass over the second coil end 22f of the winding body 2222 that is adjacent counterclockwise, and is connected to a third rectilinear portion 22c.

The third coil end portion 22g that extends outward from the third rectilinear portion 22c of the winding body 2221 extends clockwise circumferentially so as to pass under the third coil portion 22g that extends outward from the third rectilinear portion 22c of the winding body 2222, emerges before the vertex portion, shifts at the vertex portion by a distance d radially outward, extends circumferentially clockwise so as to pass over the third coil end portion 22g of the winding body 2222, and is connected to a fourth rectilinear portion 22d.

As shown in FIGS. 10 and 11, because the first through fourth rectilinear portions 22a, 22b, 22c, and 22d are shifted by a distance d radially at each of the vertex portions, the sixteen winding bodies 22 can be arranged at a pitch of one slot in a circumferential direction without interfering with each other. A winding assembly 21 that is shown in FIG. 5 is assembled by similarly arranging forty-eight winding bodies 22 at a pitch of one slot circumferentially. In this winding assembly 21, forty-eight columns of four first through fourth rectilinear portions 22a, 22b, 22c, and 22d that are lined up in a single column radially are arranged circumferentially at a pitch of one slot. The respective columns of four first through fourth rectilinear portions 22a, 22b, 22c, and 22d that are lined up in a single column radially are housed in each of the slots 13.

Figure 13:
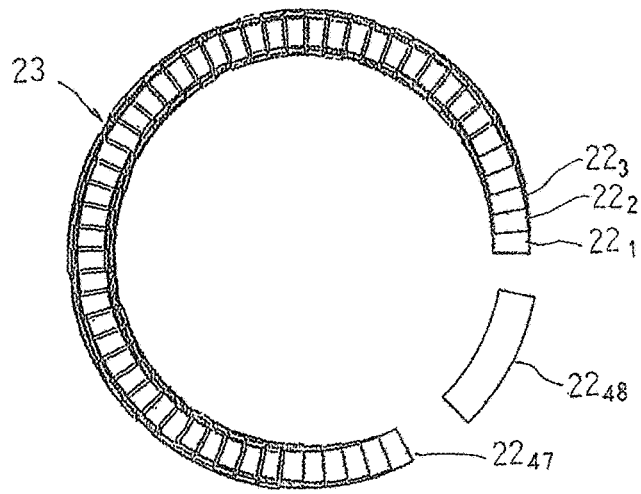
FIG. 13 is a schematic diagram that explains a procedure for installing a forty-eighth winding body in the method for assembling the winding assembly in the rotary electric machine according to Embodiment 1 of the present invention.
Figure 14:
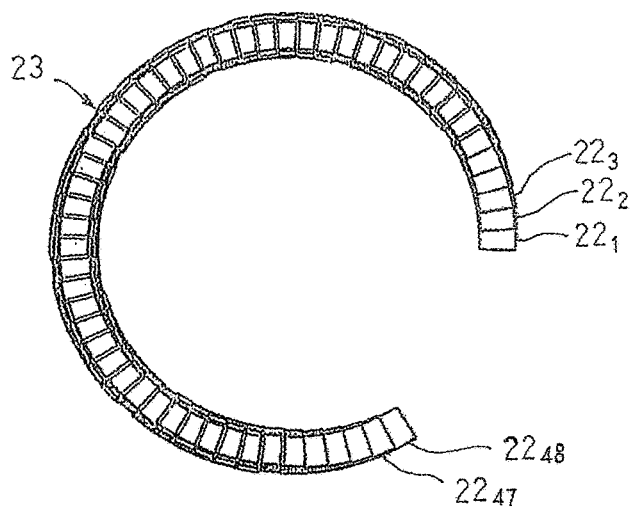
FIG. 14 is a schematic diagram that explains the procedure for installing the forty-eighth winding body in the method for assembling the winding assembly in the rotary electric machine according to Embodiment 1 of the present invention.
Figure 15:
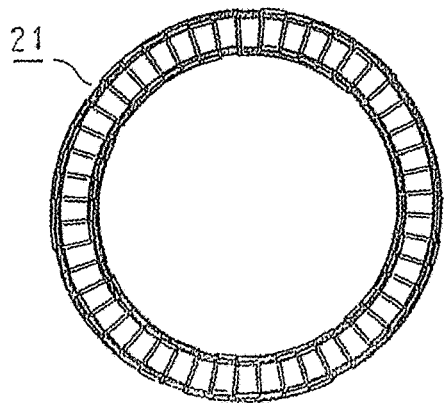
FIG. 15 is a schematic diagram that explains the procedure for installing the forty-eighth winding body in the method for assembling the winding assembly in the rotary electric machine according to Embodiment 1 of the present invention.
Figure 16:
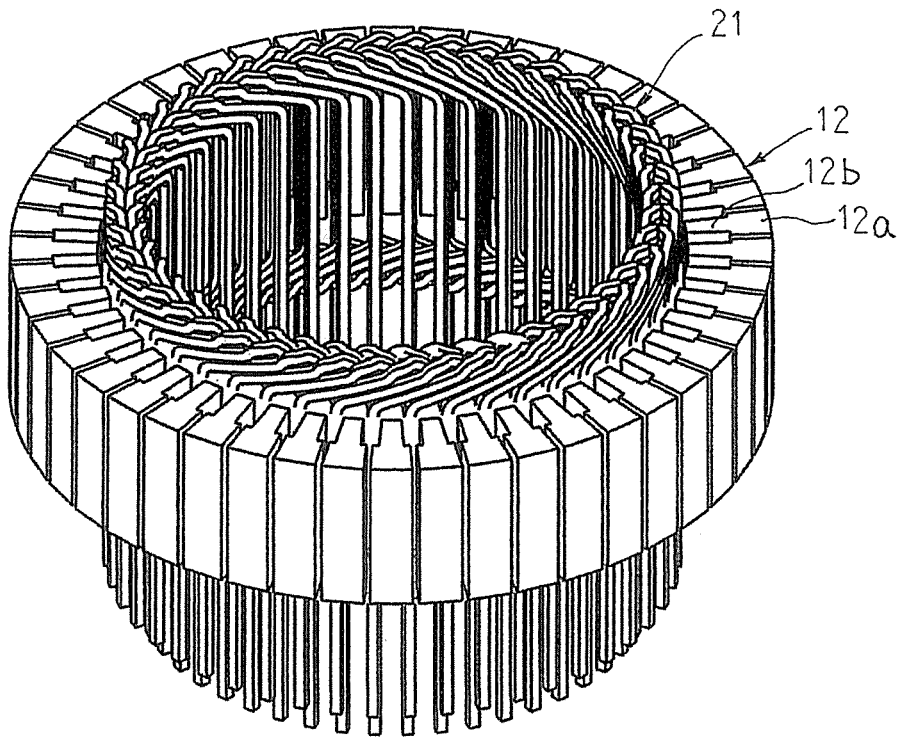
FIG. 16 is a diagram that explains a method for assembling the stator in the rotary electric machine according to Embodiment 1 of the present invention.
Figure 17:
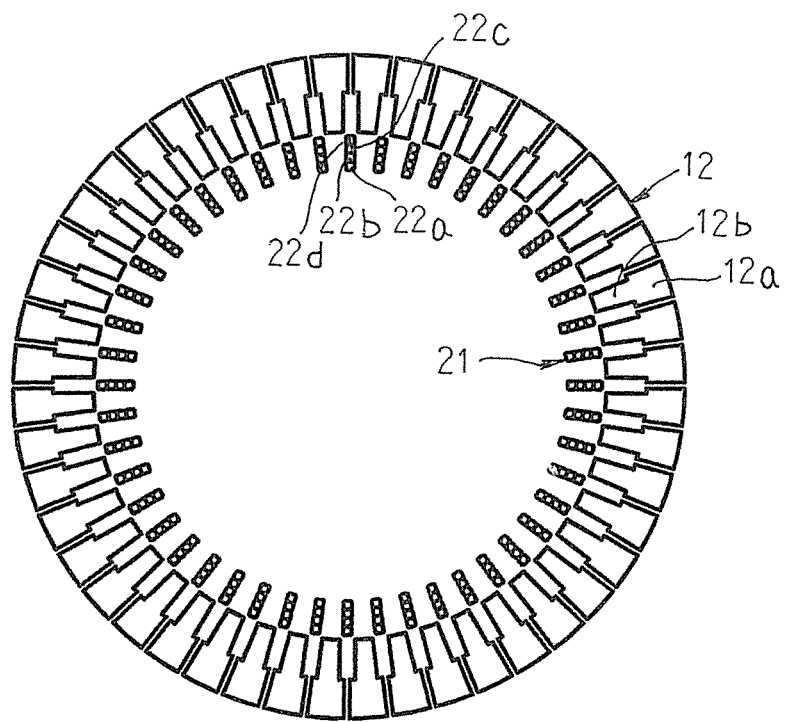
FIG. 17 is a diagram that explains the method for assembling the stator in the rotary electric machine according to Embodiment 1 of the present invention.
Figure 18:
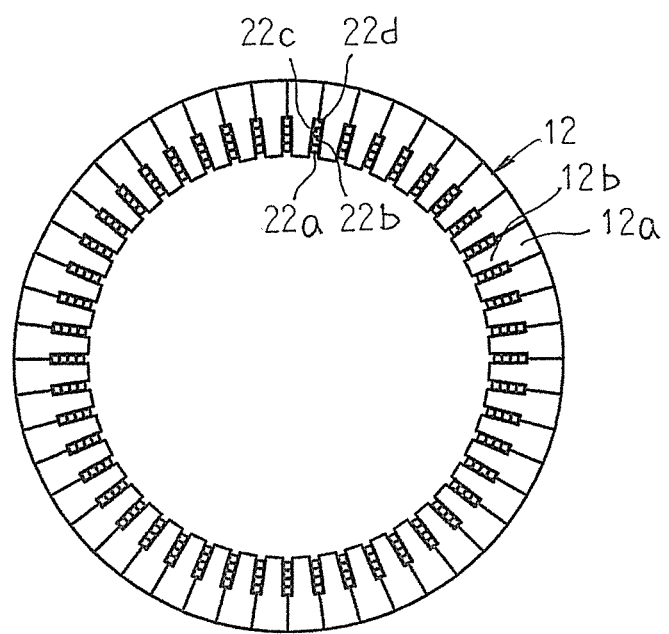
FIG. 18 is a diagram that explains the method for assembling the stator in the rotary electric machine according to Embodiment 1 of the present invention.
Figure 19:
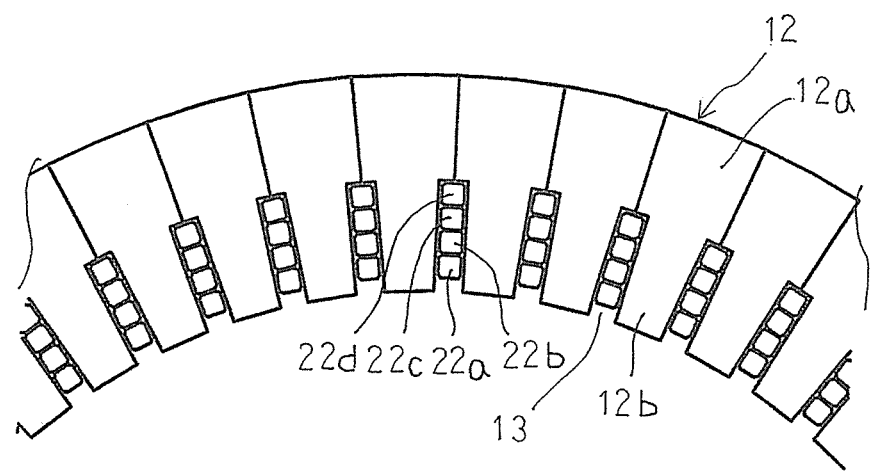
FIG. 19 is a diagram that explains the method for assembling the stator in the rotary electric machine according to Embodiment 1 of the present invention.

Next, a method for assembling the stator 10 will be explained with reference to the drawings. FIGS. 12A through 12F show schematic diagrams that explain a method for assembling the winding assembly in the rotary electric machine according to Embodiment 1 of the present invention, FIGS. 13 through 15 are schematic diagrams that explain a procedure for installing a forty-eighth winding body in the method for assembling the winding assembly in the rotary electric machine according to Embodiment 1 of the present invention, and FIGS. 16 through 19 are diagrams that explain the method for assembling the stator in the rotary electric machine according to Embodiment 1 of the present invention, FIGS. 16 and 17 showing a state before stator assembly, FIG. 18 showing a state after stator assembly, and FIG. 19 showing the state after stator assembly enlarged. Moreover, only the first through fourth rectilinear portions 22a, 22b, 22c, and 22d of the winding assembly 21 are shown in FIGS. 17 through 19, because they are cross sections that are perpendicular to an axial direction.

First, winding bodies 22 are produced by winding conductor wires 19 into the δ-shaped coil pattern. Here, to facilitate explanation, the winding bodies 22 are designated winding body $22_1$, winding body $22_2$, winding body $22_3$, winding body $22_{47}$, and winding body $22_{48}$ in order of mounting.

Figure 12A:
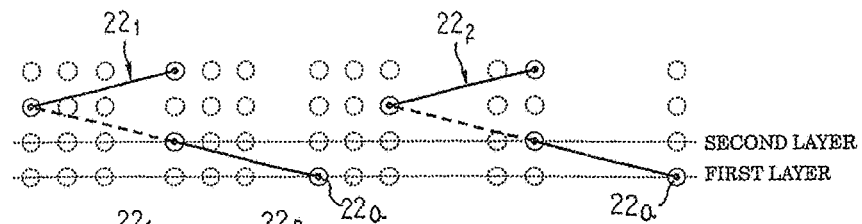
FIGS. 12A through 12F show schematic diagrams that explain a method for assembling the winding assembly in the rotary electric machine according to Embodiment 1 of the present invention.
Figure 12B:
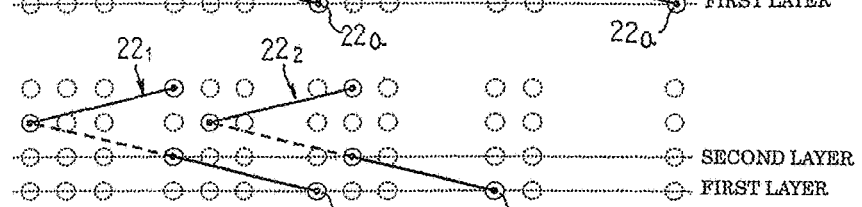
Figure 12C:
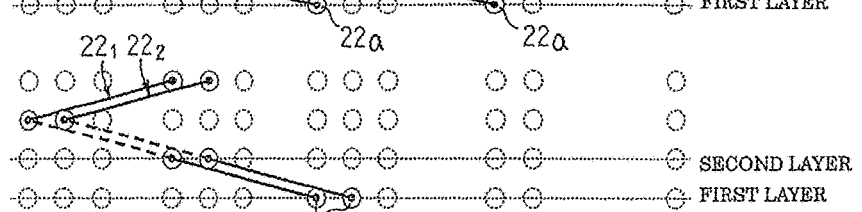

Next, as shown in FIG. 12A, the second winding body $22_2$ is placed circumferentially adjacent to the first winding body $22_1$ so as to align axial height positions. Next, as shown in FIG. 12B, the second winding body $22_2$ is moved toward the first winding body $22_1$. Then, as shown in FIG. 12C, movement of the second winding body $22_2$ is stopped when the second winding body $22_2$ approaches a pitch of one slot from the first winding body $22_1$.

Figure 12D:
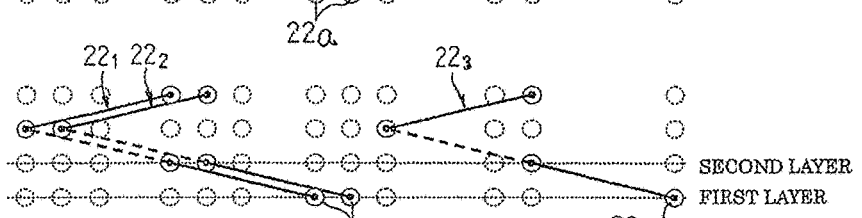
Figure 12E:
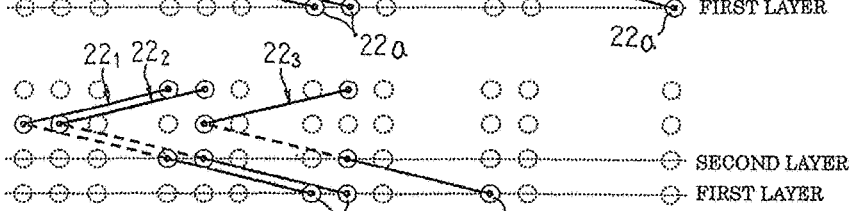
Figure 12F:
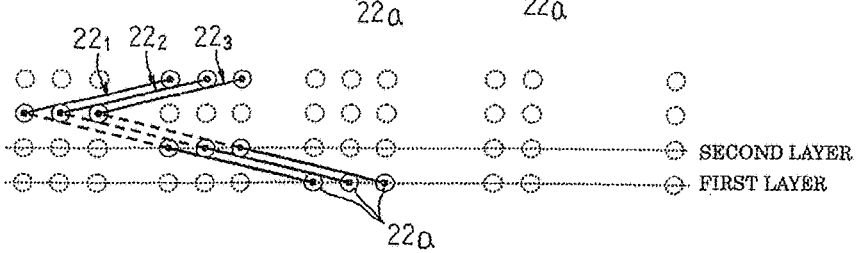

Next, as shown in FIG. 12D, the third winding body $22_3$ is placed circumferentially adjacent to the second winding body $22_2$ so as to align axial height positions. Next, as shown in FIG. 12E, the third winding body $22_3$ is moved toward the second winding body $22_2$. Then, as shown in FIG. 12F, movement of the third winding body $22_3$ is stopped when the third winding body $22_3$ approaches a pitch of one slot from the second winding body $22_2$.

Winding bodies 22 are similarly mounted sequentially by aligning axial height positions and moving them circumferentially until the forty-seventh winding body $22_{47}$. As shown in FIG. 13, an assemblage 23 in which the forty-seven winding bodies $22_1$ through $22_{47}$ are assembled is increased in diameter to form a C shape that is wider than a circumferential width of the forty-eighth winding body $22_{48}$ between the first winding body 22i and the forty-seventh winding body $22_{47}$.

Next, as shown in FIG. 14, the forty-eighth winding body $22_{48}$ is mounted onto an end in the vicinity of the forty-seventh winding body $22_{47}$. In addition, as shown in FIG. 15, an opening of the C-shaped assemblage 23 is closed, and the first winding body $22_1$ and the forty-eighth winding body $22_{48}$ are fitted together, to assemble the annular winding assembly 21.

In the winding assembly 21 that is assembled in this manner, forty-eight columns are arranged at an approximately uniform angular pitch in a circumferential direction, four first through fourth rectilinear portions 22a, 22b, 22c, and 22d being lined up in each column sequentially in order of a first rectilinear portion 22a, a second rectilinear portion 22b, a third rectilinear portion 22c, and a fourth rectilinear portion 22d from a radially inner side such that longitudinal directions of long sides of the oblong cross sections are oriented in the circumferential direction.

Next, forty-eight core blocks 12 are arranged at an approximately uniform angular pitch circumferentially such that respective teeth are positioned on a radially outer side between adjacent columns of first through fourth rectilinear portions 22a, 22b, 22c, and 22d of the winding assembly 21, as shown in FIGS. 16 and 17. Next, the core blocks 12 that are arranged circumferentially are moved radially inward. The respective teeth 12b of the core blocks 12 are thereby inserted between the adjacent columns of first through fourth rectilinear portions 22a, 22b, 22c, and 22d.

Then, when the core blocks 12 that are arranged circumferentially are moved further radially inward, the circumferential side surfaces of the adjacent core blocks 12 butt together, preventing radially inward movement of the core blocks 12. The winding assembly 22 is thereby mounted to the stator core 11, as shown in FIGS. 18 and 19, to assemble the stator 10. The first through fourth rectilinear portions 22a, 22b, 22c, and 22d are housed in each of the slots 13 such that the longitudinal directions of the long sides of the oblong cross sections are oriented circumferentially so as to be arranged in a single column in a radial direction.

Thus, by moving the core blocks 12 that are arranged in a row circumferentially radially inward so as to be inserted into the winding assembly 21, the first through fourth rectilinear portions 22a, 22b, 22c, and 22d that are lined up irregularly in the radial direction are arranged neatly in a column by movement that narrows the spacing between the teeth 12b of the adjacent core blocks 12. In addition, gaps between each of the first through fourth rectilinear portions 22a, 22b, 22c, and 22d that are arranged neatly in a column in the radial direction are reduced or eliminated by the radially inward movement of the core back portions 12a of the core blocks 12. Thus, space factor of the conductor wires 19 inside the slots 13 can be improved. Because the conductor wires 19 inside the slots 13 and the core blocks 12 are in contact with each other, and heat transfer performance to the stator core 11 from the winding assembly 21, which constitutes a heat-generating body during passage of electric current, can be improved, temperature increases in the winding assembly 21 are suppressed, enabling increases in electrical resistance to be suppressed. Because the core blocks 12 are inserted such that the spacing between the adjacent teeth 12b becomes gradually narrower, sliding movement at contact surfaces between the winding assembly 21 and the core blocks 12 is suppressed, enabling damage to insulating coatings of the conductor wires 19 to be prevented.

Figure 20:
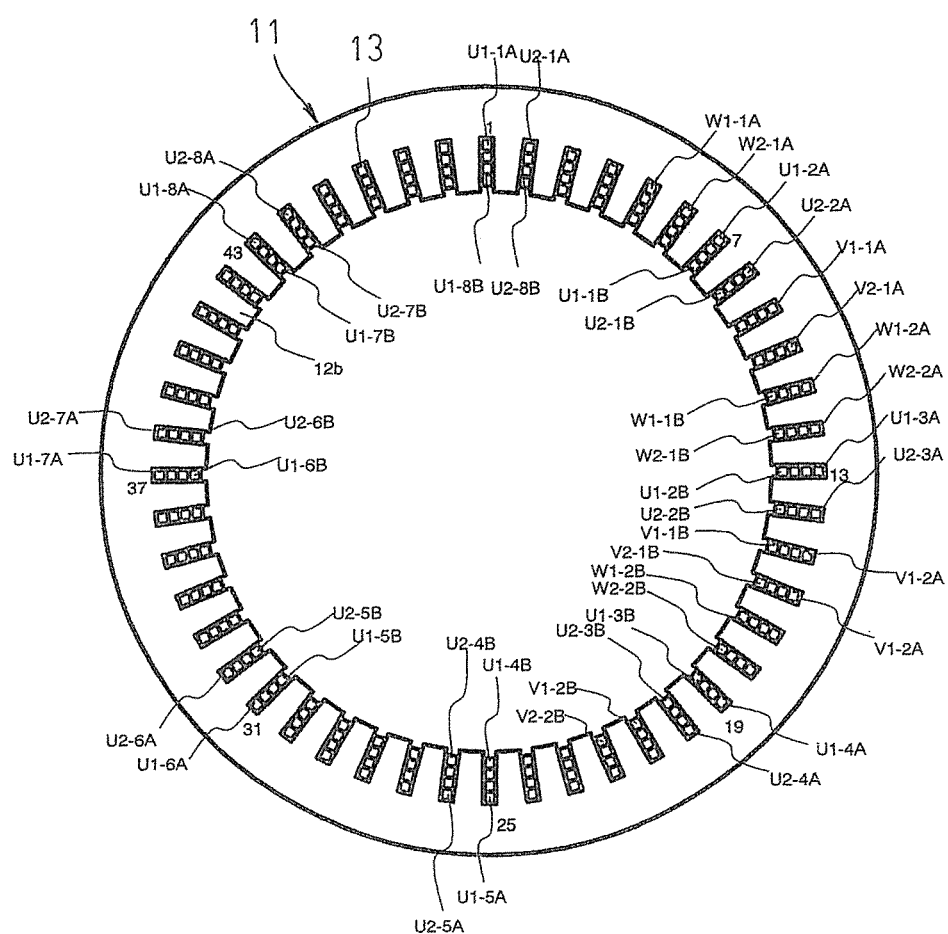
FIG. 20 is an end elevation of the stator in the rotary electric machine according to Embodiment 1 of the present invention when viewed from the vicinity of the first coil ends.
Figure 21:
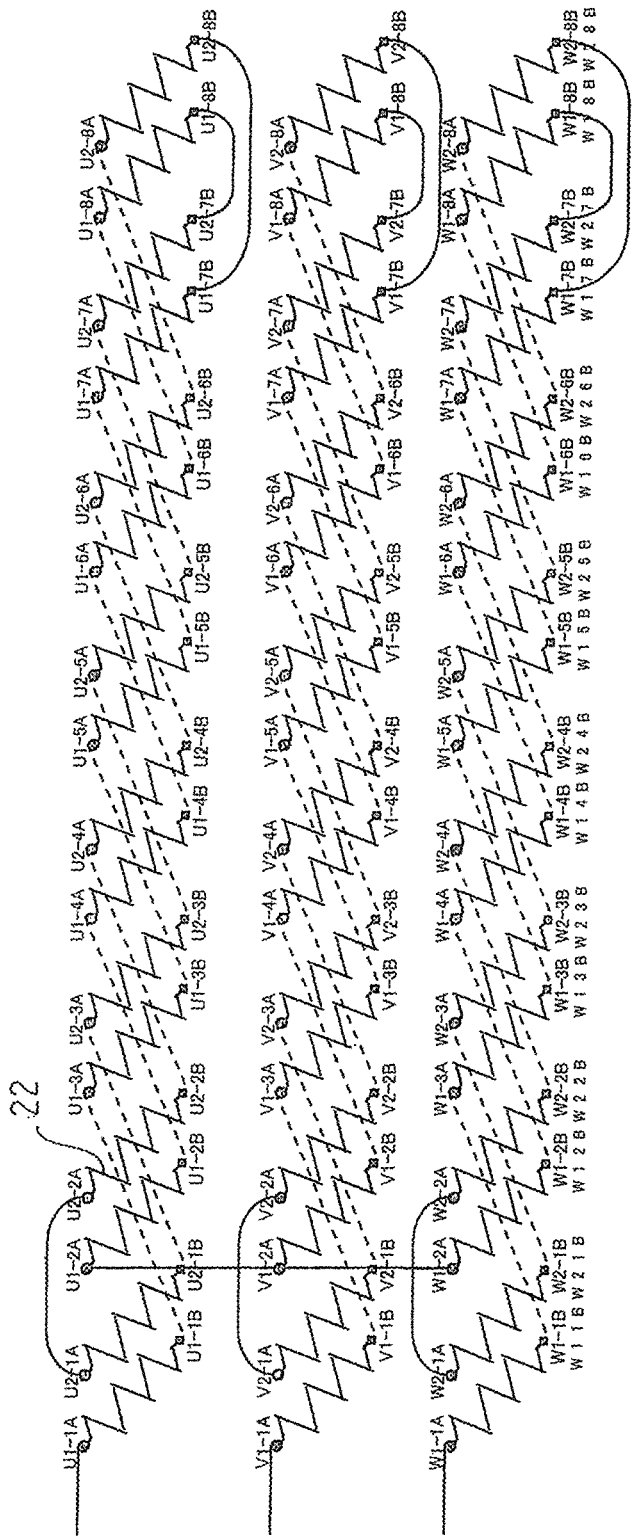
FIG. 21 is a first connection diagram for the stator winding in the rotary electric machine according to Embodiment 1 of the present invention.

Next, a method for connecting the winding assembly 21 will be explained with reference to FIGS. 20 and 21. FIG. 20 is an end elevation of the stator in the rotary electric machine according to Embodiment 1 of the present invention when viewed from the vicinity of the first coil ends, and FIG. 21 is a first connection diagram for the stator winding in the rotary electric machine according to Embodiment 1 of the present invention.

In FIG. 20, 1, 7, 13, etc., through 43 are slot numbers that have been allotted to the slots 13 sequentially in a circumferential direction. U1-1A, U1-2A, etc., through U1-8A and U1-1B, U1-2B, etc., through U1-8B are winding ends 21h and 21i of winding bodies 22 that constitute a U1 phase that is mounted into a group of slots 13 at Slot Numbers (1+6 n), where n is an integer from 0 through 7, and U2-1A, U2-2A, etc., through U2-8A and U2-1B, U2-2B, etc., through U2-8B are winding ends 21h and 21i of winding bodies 22 that constitute a U2 phase that is mounted into a group of slots 13 at Slot Numbers (2+6 n).

Winding bodies 22 are also mounted into a slot group at Slot Numbers (3+6 n) to constitute a V1 phase, and winding bodies 22 are mounted into a slot group at Slot Numbers (4+6 n) to constitute a V2 phase. Winding bodies 22 are also mounted into a slot group at Slot Numbers (5+6 n) to constitute a W1 phase, and winding bodies 22 are mounted into a slot group at Slot Numbers (6+6 n) to constitute a W2 phase. Here, to facilitate explanation, only V1-1A, V1-2A, V1-1B, and V1-2B (winding ends of the winding bodies 22 that constitute the V1 phase), V2-1A, V2-2A, V2-1B, and V2-2B (winding ends of the winding bodies 22 that constitute the V2 phase), W1-1A, W1-2A, W1-1B, and W1-1B (winding ends of the winding bodies 22 that constitute the W1 phase), and W2-1A, W2-2A, W2-1B, and W2-2B (winding ends of the winding bodies 22 that constitute the W2 phase) are shown.

First, U1-1B and U1-3A, U1-3B and U1-5A, U1-5B and U1-7A, U1-7B and U2-8B, U2-8A and U2-6B, U2-6A and U2-4B, U2-4A and U2-2B, U2-2A and U2-1A, U2-1B and U2-3A, U2-3B and U2-5A, U2-5B and U2-7A, U2-7B and U1-8B, U1-8A and U1-6B, U1-6A and U1-4B, and U1-4A and U1-2B are connected. A U-phase winding in which sixteen winding bodies 22 that constitute a U1 phase and a U2 phase are connected in series is obtained thereby.

Next, V1-1B and V1-3A, V1-3B and V1-5A, V1-5B and V1-7A, V1-7B and V2-8B, V2-8A and V2-6B, V2-6A and V2-4B, V2-4A and V2-2B, V2-2A and V2-1A, V2-1B and V2-3A, V2-3B and V2-5A, V2-5B and V2-7A, V2-7B and V1-8B, V1-8A and V1-6B, V1-6A and V1-4B, and V1-4A and V1-2B are connected. A V-phase winding in which sixteen winding bodies 22 that constitute a V1 phase and a V2 phase are connected in series is obtained thereby.

Next, W1-1B and W1-3A, W1-3B and W1-5A, W1-5B and W1-7A, W1-7B and W2-8B, W2-8A and W2-6B, W2-6A and W2-4B, W2-4A and W2-2B, W2-2A and W2-1A, W2-1B and W2-3A, W2-3B and W2-5A, W2-5B and W2-7A, W2-7B and W1-8B, W1-8A and W1-6B, W1-6A and W1-4B, and W1-4A and W1-2B are connected. A W-phase winding in which sixteen winding bodies 22 that constitute a W1 phase and a W2 phase are connected in series is obtained thereby.

U1-2A, V1-2A, and W1-2A are also connected. Thus, using a first connection method, a stator winding 20 is obtained that is configured by wye-connecting a U-phase winding in which sixteen winding bodies 22 are connected in series, a V-phase winding in which sixteen winding bodies 22 are connected in series, and a W-phase winding in which sixteen winding bodies 22 are connected in series. This stator winding 20 constitutes a three-phase alternating-current winding that is a distributed winding of full-pitch windings. U1-1A becomes an electric power supply end of the U-phase winding, V1-1A becomes an electric power supply end of the V-phase winding, and W1-1A becomes an electric power supply end of the W-phase winding.

Figure 22:
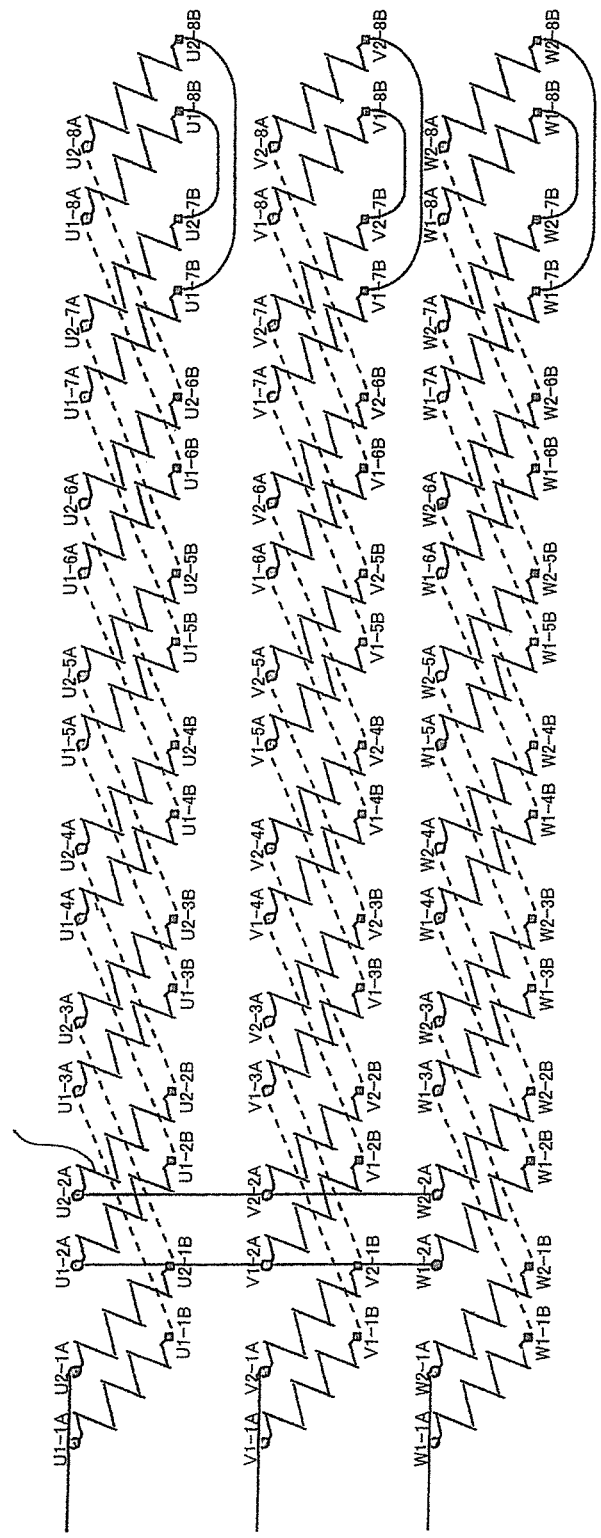
FIG. 22 is a second connection diagram for the stator winding in the rotary electric machine according to Embodiment 1 of the present invention.

Next, a second method for connecting the winding assembly 21 will be explained with reference to FIGS. 20 and 22. FIG. 22 is a second connection diagram for the stator winding in the rotary electric machine according to Embodiment 1 of the present invention.

U1-1A and U2-1A are first connected. Then, U1-1B and U1-3A, U1-3B and U1-5A, U1-5B and U1-7A, U1-7B and U2-8B, U2-8A and U2-6B, U2-6A and U2-4B, and U2-4A and U2-2B are connected. Next, U2-1B and U2-3A, U2-3B and U2-5A, U2-5B and U2-7A, U2-7B and U1-8B, U1-8A and U1-6B, U1-6A and U1-4B, and U1-4A and U1-2B are connected. A U-phase winding is obtained thereby in which two winding groups are connected in parallel, eight winding bodies 22 that constitute a U1 phase and a U2 phase being connected in series in each of the winding groups.

V1-1A and V2-1A are also connected. Then, V1-1B and V1-3A, V1-3B and V1-5A, V1-5B and V1-7A, V1-7B and V2-8B, V2-8A and V2-6B, V2-6A and V2-4B, and V2-4A and V2-2B are connected. Next, V2-1B and V2-3A, V2-3B and V2-5A, V2-5B and V2-7A, V2-7B and V1-8B, V1-8A and V1-6B, V1-6A and V1-4B, and V1-4A and V1-2B are connected. A V-phase winding is obtained thereby in which two winding groups are connected in parallel, eight winding bodies 22 that constitute a V1 phase and a V2 phase being connected in series in each of the winding groups.

W1-1A and W2-1A are also connected. Then, W1-1B and W1-3A, W1-3B and W1-5A, W1-5B and W1-7A, W1-7B and W2-8B, W2-8A and W2-6B, W2-6A and W2-4B, and W2-4A and W2-2B are connected. Next, W2-1B and W2-3A, W2-3B and W2-5A, W2-5B and W2-7A, W2-7B and W1-8B, W1-8A and W1-6B, W1-6A and W1-4B, and W1-4A and W1-2B are connected. A W-phase winding is obtained thereby in which two winding groups are connected in parallel, eight winding bodies 22 that constitute a W1 phase and a W2 phase being connected in series in each of the winding groups.

U1-2A, V1-2A, and W1-2A are also connected, and U2-2A, V2-2A, and W2-2A are connected. Thus, using the second connection method, a stator winding 20A is obtained that is configured by wye-connecting a U-phase winding in which two winding groups in each of which eight winding bodies 22 are connected in series are connected in parallel, a V-phase winding in which two winding groups in each of which eight winding bodies 22 are connected in series are connected in parallel, and a W-phase winding in which two winding groups in each of which eight winding bodies 22 are connected in series are connected in parallel. This stator winding 20A constitutes a three-phase alternating-current winding that is a distributed winding of full-pitch windings.

Figure 23:
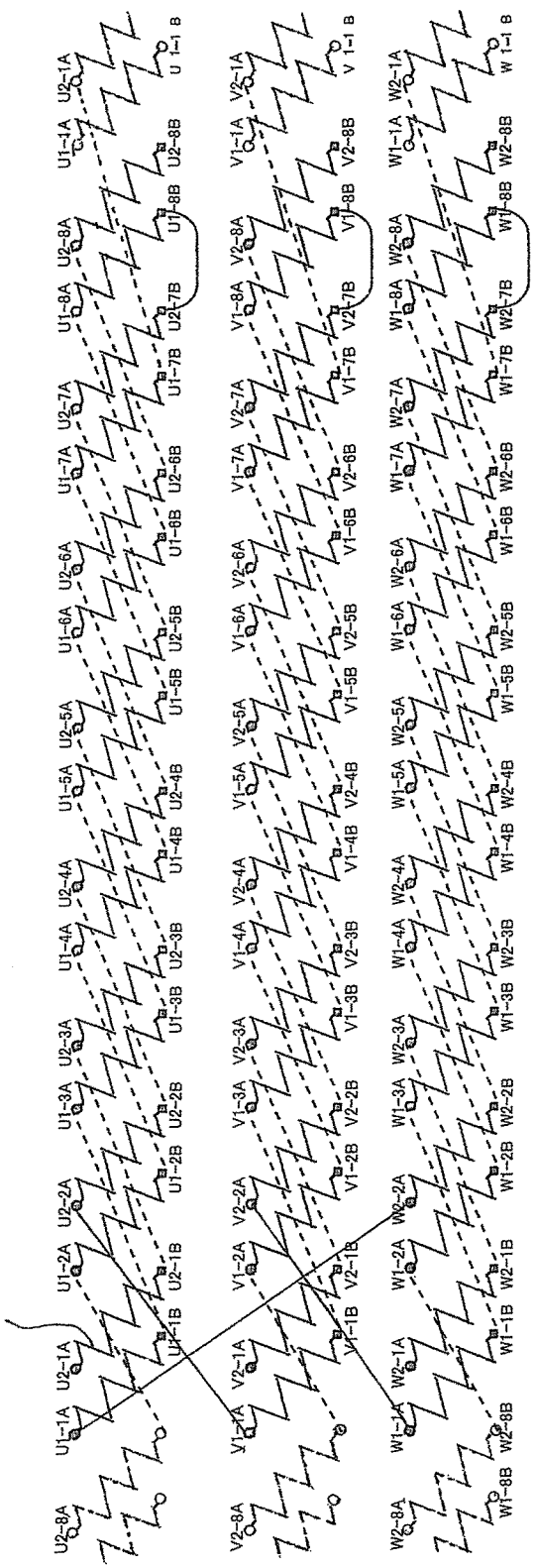
FIG. 23 is a third connection diagram for the stator winding in the rotary electric machine according to Embodiment 1 of the present invention.

Next, a third method for connecting the winding assembly 21 will be explained with reference to FIGS. 20 and 23. FIG. 23 is a third connection diagram for the stator winding in the rotary electric machine according to Embodiment 1 of the present invention.

First, U1-1B and U1-3A, U1-3B and U1-5A, U1-5B and U1-7A, U1-7B and U2-1A, U2-1B and U2-3A, U2-3B and U2-5A, U2-5B and U2-7A, U2-7B and U1-8B, U1-8A and U1-6B, U1-6A and U1-4B, U1-4A and U1-2B, U1-2A and U2-8B, U2-8A and U2-6B, U2-6A and U2-4B, U2-4A and U2-2B are connected. A U-phase winding in which sixteen winding bodies 22 that constitute a U1 phase and a U2 phase are connected in series is obtained thereby.

Next, V1-1B and V1-3A, V1-3B and V1-5A, V1-5B and V1-7A, V1-7B and V2-1A, V2-1B and V2-3A, V2-3B and V2-5A, V2-5B and V2-7A, V2-7B and V1-8B, V1-8A and V1-6B, V1-6A and V1-4B, V1-4A and V1-2B, V1-2A and V2-8B, V2-8A and V2-6B, V2-6A and V2-4B, and V2-4A and V2-2B are connected. A V-phase winding in which sixteen winding bodies 22 that constitute a V1 phase and a V2 phase are connected in series is obtained thereby.

Then, W1-1B and W1-3A, W1-3B and W1-5A, W1-5B and W1-7A, W1-7B and W2-1A, W2-1B and W2-3A, W2-3B and W2-5A, W2-5B and W2-7A, W2-7B and W1-8B, W1-8A and W1-6B, W1-6A and W1-4B, and W1-4A and W1-2B, W1-2A and W2-8B, W2-8A and W2-6B, W2-6A and W2-4B, and W2-4A and W2-2B are connected. A W-phase winding in which sixteen winding bodies 22 that constitute a W1 phase and a W2 phase are connected in series is obtained thereby.

In addition, U2-2A and V1-1A are connected, V2-2A and W1-1A are connected, and W2-2A and U1-1A are connected. Thus, using the third connection method, a stator winding 20B is obtained that is configured by delta-connecting a U-phase winding in which sixteen winding bodies 22 are connected in series, a V-phase winding in which sixteen winding bodies 22 are connected in series, and a W-phase winding in which sixteen winding bodies 22 are connected in series. This stator winding 20B constitutes a three-phase alternating-current winding that is a distributed winding of full-pitch windings.

A rotary electric machine 100 that uses a stator 10 that includes a stator winding 20, 20A, or 20B that is connected in this manner operates as an eight-pole forty-eight-slot inner-rotor three-phase motor when alternating-current power is supplied to the stator winding 20, 20A, or 20B.

In the rotary electric machine 100 that is configured in this manner, a stator winding 20 is constituted by a winding assembly 21 that is configured such that winding bodies 22 that are produced by winding conductor wires 19 into a δ-shaped coil pattern are arranged at a pitch of one slot circumferentially. Thus, the winding bodies 22 have a dimension of two poles, and the length of the conductor wires 19 is significantly shorter than in the stator winding that is described in Patent Literature 2. Thus, the scale of manufacturing apparatus can be reduced, enabling reductions in price to be achieved. Reductions in the resistance of the stator winding 20 are also enabled, enabling the efficiency of the rotary electric machine 100 to be improved. In addition, reductions in weight are also enabled because heat generation in the stator winding 20 is suppressed due to reductions in the resistance of the stator winding 20, enabling thermal degradation of the parts used to be suppressed, and because the length of the conductor wires is shorter.

Because the winding bodies 22 can easily be produced with different axial lengths in the first through fourth rectilinear portions 22a, 22b, 22c, and 22d, adaptation to changes in the axial length of the stator core 11 to which they are mounted can be made inexpensively and simply.

The winding bodies 22 are configured such that vertex portions of first through third coil end portions 22e, 22f, and 22g are shifted in a radial direction by a gap d that is approximately equal to the radial dimensions of the first through fourth rectilinear portions 22a, 22b, 22c, and 22d. Thus, because the bending radius at the vertex portions is reduced, the radial and axial dimensions of the coil ends are reduced compared to the stator winding that is described in Patent Literature 1. Thus, downsizing of the rotary electric machine 100 can be achieved. Because the length of the conductor wires 19 is also shorter, reductions in the resistance of the stator winding 20 can be achieved, thereby enabling the efficiency of the rotary electric machine 100 to be improved. In addition, reductions in weight are also enabled because heat generation in the stator winding 20 is suppressed due to the reductions in the resistance of the stator winding 20, enabling thermal degradation of the parts used to be suppressed, and the length of the conductor wires 19 is shorter.

Because the winding bodies 22 are configured such that vertex portions of the first through third coil end portions 22e, 22f, and 22g are shifted in a radial direction by a gap d that is approximately equal to the radial dimensions of the first through fourth rectilinear portions 22a, 22b, 22c, and 22d, the winding bodies 22 can be arranged at a pitch of one slot without interference, improving assembly of the winding assembly 21. Because a winding assembly 21 is assembled by arranging identically shaped winding bodies 22 circumferentially at a pitch of one slot, it is not necessary to produce other types of winding bodies, reducing the number of units of manufacturing equipment, simplifying the configuration of the equipment, and improving mass producibility.

The U-phase, V-phase, and W-phase windings that constitute the stator winding 20, 20A, or 20B are each configured by connecting in series winding bodies 22 that are mounted into adjacent slots 13. Because the winding bodies 22 that are mounted into the adjacent slots 13 have different electrical angles, voltages that are induced by the rotor 5 in the winding bodies 22 that are mounted into the adjacent slots 13 are different, reducing eddy currents that flow inside the conductor wires 19.

The first through third coil end portions 22e, 22f, and 22g are constituted by two circular arc shapes that are shifted by a gap d radially at the vertex portions when viewed from an axial direction, and the first through third coil end portions 22e, 22f, and 22g are positioned radially further outward than the tip end surfaces of the teeth 12b of the stator core 11. Thus, interference between the first through third coil end portions 22e, 22f, and 22g and the rotor 5 is reliably prevented. Because the first through third coil end portions 22e, 22f, and 22g are also positioned radially inside the core back portion 12a of the stator core 11, vacant space that is formed axially outside the core back portion 12a can be used as installation space for cooling members, etc.

Because the first through fourth rectilinear portions 22a, 22b, 22c, and 22d that are arranged in a single column radially inside the slots 13 are formed so as to have oblong cross sections, space factor is increased, enabling increased output to be achieved in the rotary electric machine 100.

Because the first through fourth rectilinear portions 22a, 22b, 22c, and 22d are arranged in a single column radially inside the slots 13 such that longitudinal directions of long sides of the oblong cross sections are oriented circumferentially, dimensions are reduced in the slot depth direction, enabling downsizing of the radial dimensions of the rotary electric machine 100 to be achieved.

Figure 24:
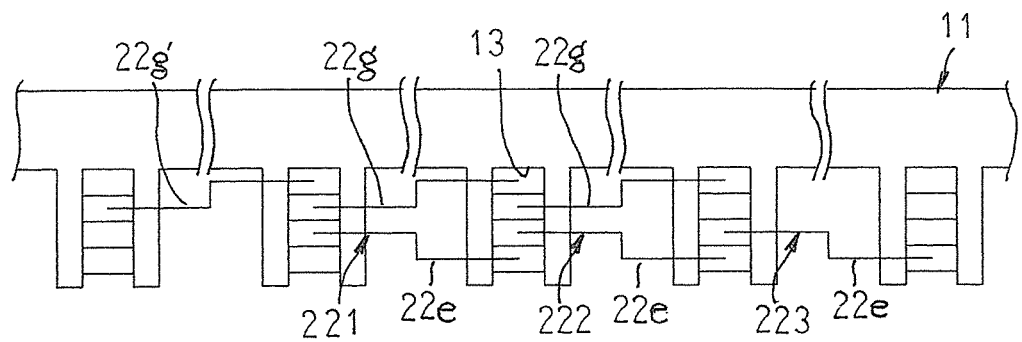
FIG. 24 is a schematic diagram of a state in which three winding bodies are mounted into an identical slot group in the stator for a rotary electric machine according to Embodiment 1 of the present invention when viewed from a vicinity of the first coil ends.
Figure 25:
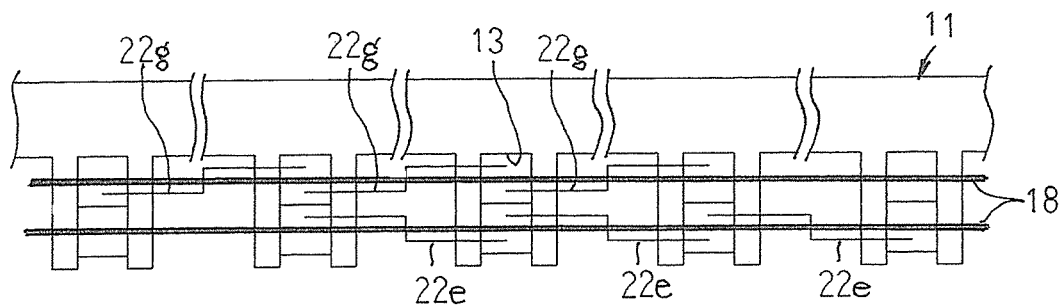
FIG. 25 is a schematic diagram that explains arrangement of insulating papers in the vicinity of the first coil ends in the stator for a rotary electric machine according to Embodiment 1 of the present invention.
Figure 26:
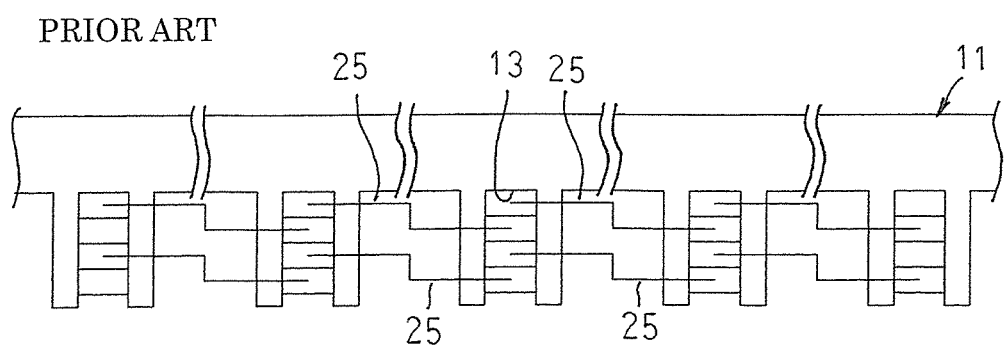
FIG. 26 is a schematic diagram of a state in which a stator winding is mounted in a conventional stator for a rotary electric machine when viewed from a vicinity of first coil ends.
Figure 27:
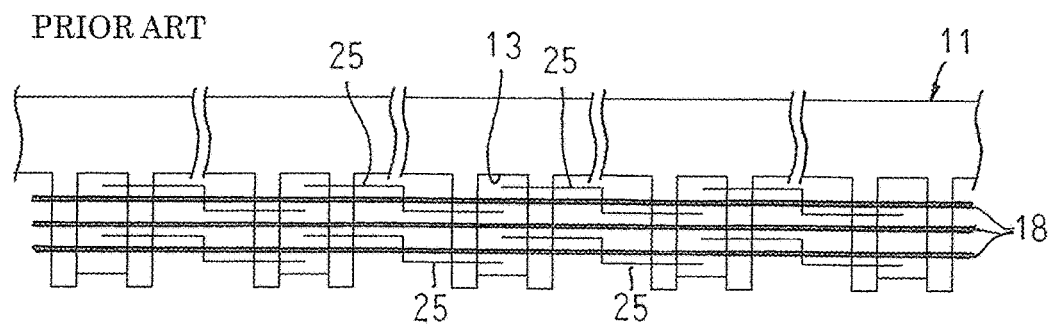
FIG. 27 is a schematic diagram that explains arrangement of insulating papers in the vicinity of the first coil ends in the conventional stator for a rotary electric machine.
Figure 28:
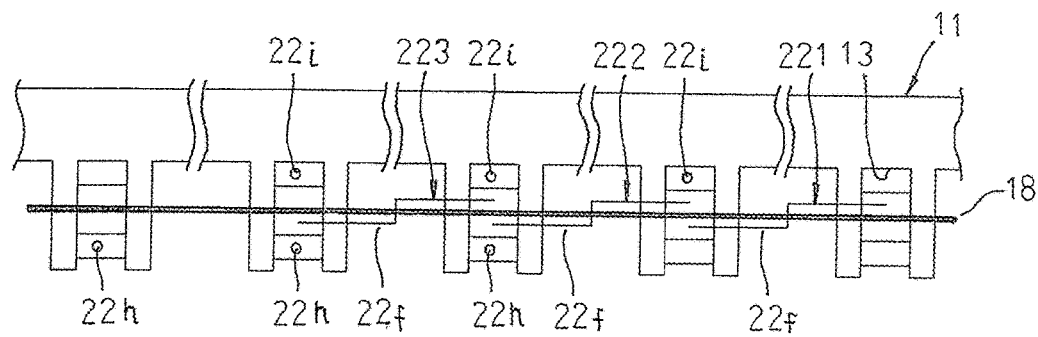
FIG. 28 is a schematic diagram that explains arrangement of insulating papers in a vicinity of second coil ends in the stator for a rotary electric machine according to Embodiment 1 of the present invention.
Figure 29:
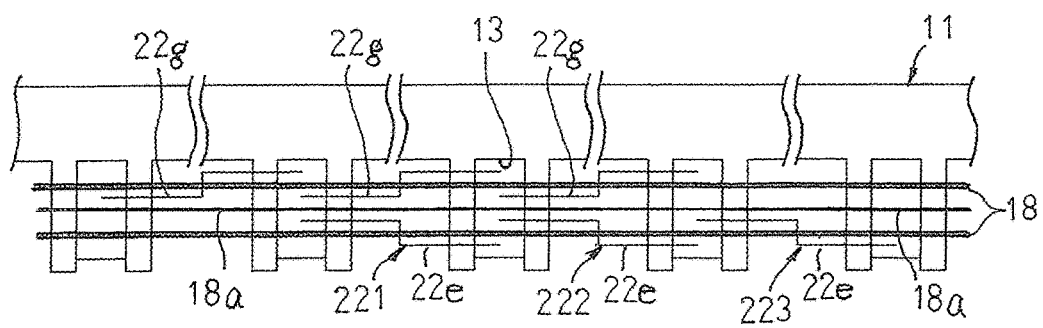
FIG. 29 is a schematic diagram that explains a variation of the arrangement of insulating papers in the vicinity of the first coil ends in the stator for a rotary electric machine according to Embodiment 1 of the present invention.

Next, the insulating construction of the stator winding 20 will be explained. FIG. 24 is a schematic diagram of a state in which three winding bodies are mounted into an identical slot group in the stator for a rotary electric machine according to Embodiment 1 of the present invention when viewed from the vicinity of the first coil ends, FIG. 25 is a schematic diagram that explains arrangement of insulating papers in the vicinity of the first coil ends in the stator for a rotary electric machine according to Embodiment 1 of the present invention, FIG. 26 is a schematic diagram of a state in which a stator winding is mounted in a conventional stator for a rotary electric machine when viewed from a vicinity of first coil ends, FIG. 27 is a schematic diagram that explains arrangement of insulating papers in the vicinity of the first coil ends in the conventional stator for a rotary electric machine, FIG. 28 is a schematic diagram that explains arrangement of insulating papers in a vicinity of second coil ends in the stator for a rotary electric machine according to Embodiment 1 of the present invention, and FIG. 29 is a schematic diagram that explains a variation of the arrangement of insulating papers in the vicinity of the first coil ends in the stator for a rotary electric machine according to Embodiment 1 of the present invention.

In FIG. 24, in the vicinity of the first coil ends, focusing on one slot 13 that three winding bodies 22 share, a first coil end portion 22e of the first winding body $22_1$ extends outward in a first circumferential direction from the first layer from an inner radial side of the slot 13, a first coil end portion 22e of the second winding body 22₂ extends outward in a second circumferential direction from the second layer from the inner radial side of the slot 13, a third coil end portion 22g of the third winding body 22₃ extends outward in the second circumferential direction from the third layer from the inner radial side of the slot 13, and a third coil end portion 22g of the second winding body 22₂ extends outward in the first circumferential direction from the fourth layer from the inner radial side of the slot 13.

From FIG. 24, it can be seen that the first and third coil end portions 22e and 22g in the second layer and the third layer of the slot 13 extend outward from the slot 13 in a like circumferential direction. In other words, in the second layer and the third layer of the first coil ends, same-phase coil end portions are disposed so as to be radially adjacent, and the electric potential difference between the coil end portions is small. From FIG. 22, it can be seen that the first coil end portions 22e in the first layer and the second layer of the slot 13 extend outward from the slot 13 in opposite circumferential directions, and that the third coil end portions 22g in the third layer and the fourth layer of the slot 13 extend outward from the slot 13 in opposite circumferential directions. In other words, in the first layer and the second layer of the first coil ends, different-phase coil end portions cross each other in a radial direction, and the electric potential difference between the coil end portions is large. Similarly, in the third layer and the fourth layer of the first coil ends, different-phase coil end portions cross each other in a radial direction, and the electric potential difference between the coil end portions is large.

From the above, in the first coil ends, it is necessary to increase the voltage tolerance of the insulation between the first coil end portions 22e in the first layer and the second layer and between the third coil end portions 22g in the third layer and the fourth layer. Thus, insulation performance is ensured by setting the thickness of the insulating coating of the conductor wire 19 such that dielectric breakdown does not occur due to electric potential differences between same-phase coils, and by disposing insulating papers 18 between the first coil end portions 22e in the first layer and the second layer and between the third coil end portions 22g in the third layer and the fourth layer, as shown in FIG. 25. Thus, the insulating coating of the conductor wire 19 does not become excessively thick, enabling reductions in the space factor inside the slots 13 to be suppressed.

Now, in the rotary electric machine according to Patent Literature 2, because the stator winding is formed using wave windings, the coil end portions 25 extend outward in the first circumferential direction from the first layer and the third layer of the slots 13, and extend outward in the second circumferential direction from the second layer and the fourth layer, as shown in FIG. 26. Different-phase coil end portions 25 cross each other in a radial direction between each of the layers of the coil ends, making the electric potential differences between the coil end portions 25 greater. Thus, it is necessary to ensure interphase insulation by disposing insulating papers 18 between the coil end portions 25 in the first layer and the second layer, between the coil end portions 25 in the second layer and the third layer, and between the coil end portions 25 in the third layer and the fourth layer, as shown in FIG. 27.

Thus, according to Embodiment 1, an insulating paper 18 that is disposed between the first and third coil end portions 22e and 22g in the second layer and the third layer of the first coil ends is no longer required compared to Patent Literature 2, enabling radial dimensions of the first coil ends to be reduced proportionately.

In the vicinity of the second coil ends, in each of the slots 13, the second coil end portions 22f of different winding bodies 22₂ extend outward in opposite circumferential directions from the second layer and the third layer from radially inner sides of the slots 13, as shown in FIG. 28. In other words, in the second layer and the third layer of the second coil ends, different-phase coil end portions cross each other in a radial direction, and the electric potential difference between the coil end portions is large. Thus, interphase insulation is ensured by disposing an insulating paper 18 between the second coil end portions 22f in the second layer and the third layer. Consequently, radial dimensions of the second coil ends can be reduced.

Moreover, in Embodiment 1 above, an insulating paper 18a that is thinner than the insulating paper 18 may be disposed between the first and third coil end portions 22e and 22g in the second layer and the third layer of the first coil ends, as shown in FIG. 29. In that case, because the insulating paper 18a that is thinner than the insulating paper 18 can be disposed between the first and third coil end portions 22e and 22g in the second layer and the third layer, radial dimensions of the first coil ends can be reduced compared to Patent Literature 2.

Embodiment 2

Figure 30:
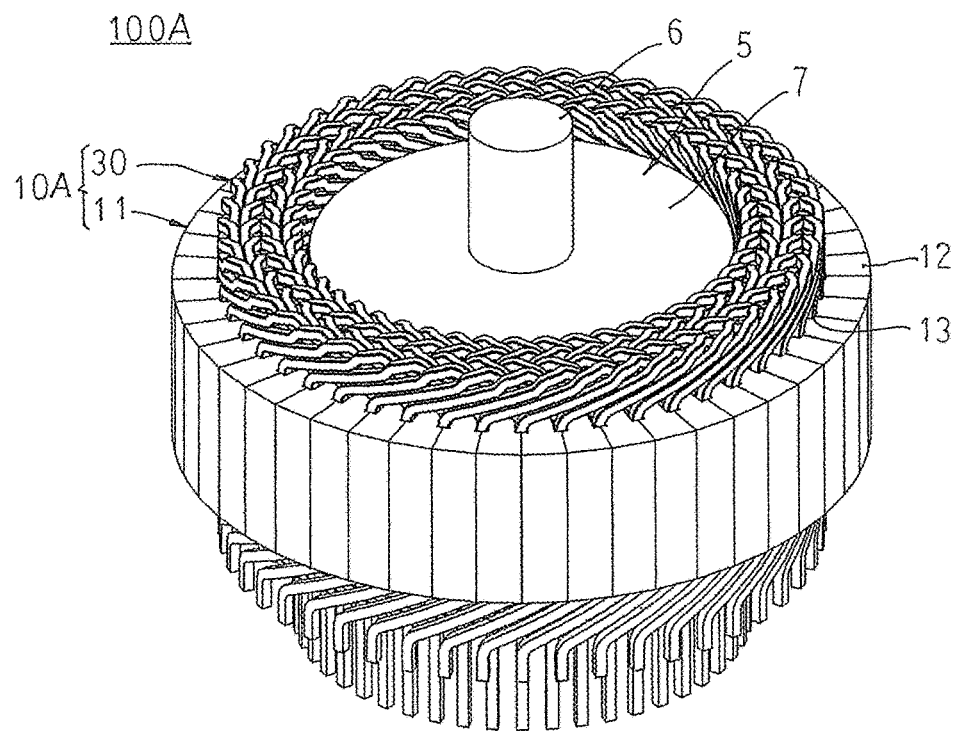
FIG. 30 is an oblique projection that shows part of a rotary electric machine according to Embodiment 2 of the present invention.
Figure 31:
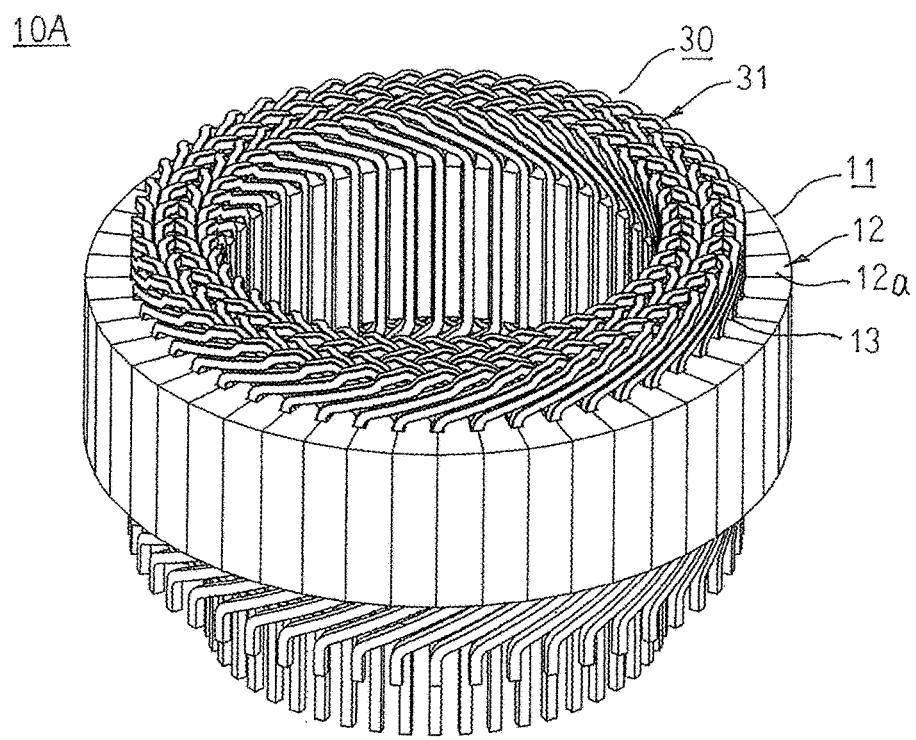
FIG. 31 is an oblique projection that shows a stator that is used in the rotary electric machine according to Embodiment 2 of the present invention.
Figure 32:
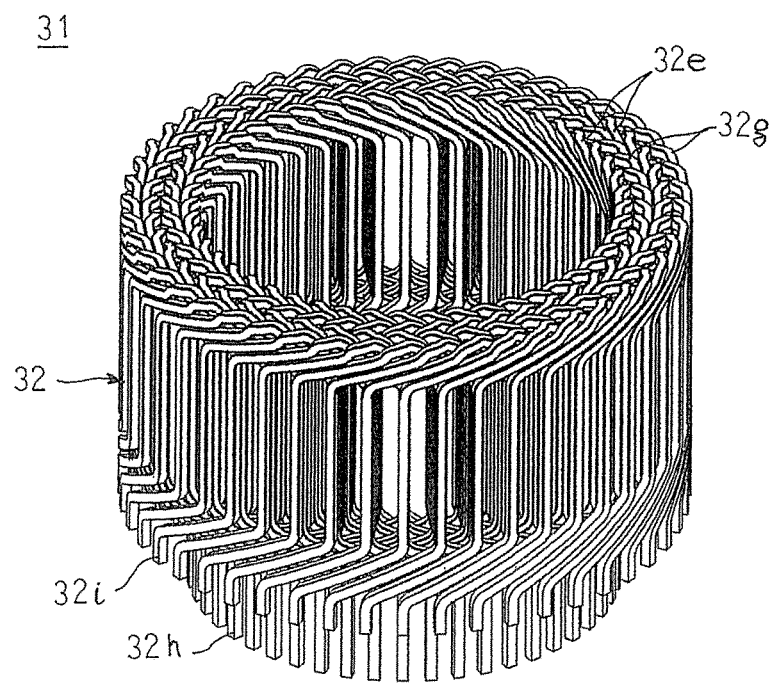
FIG. 32 is an oblique projection that shows a winding assembly that constitutes part of a stator winding of the stator that is used in the rotary electric machine according to Embodiment 2 of the present invention.
Figure 33:
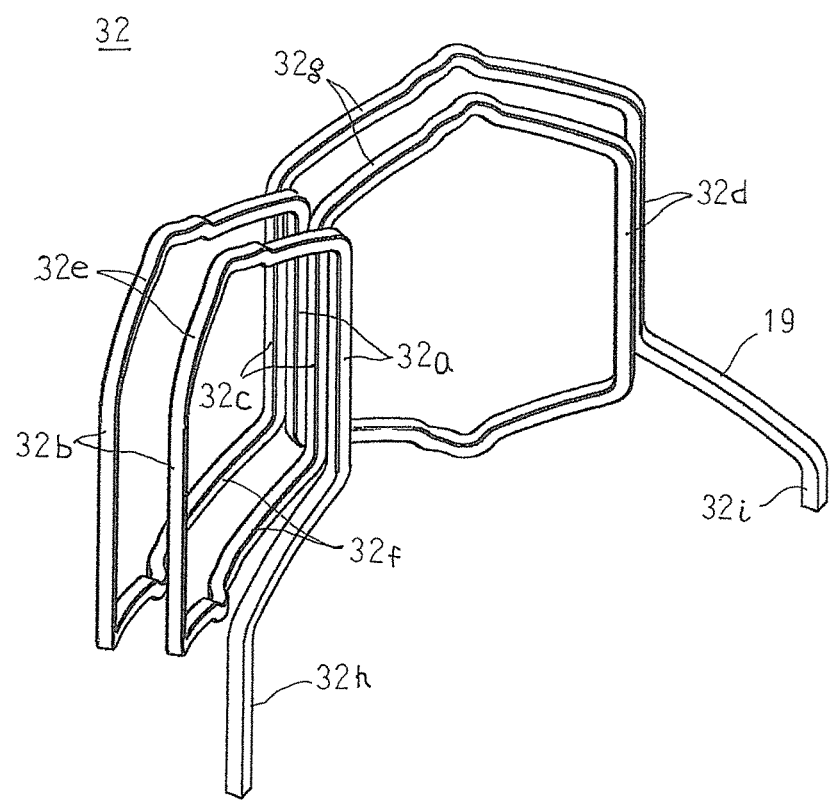
FIG. 33 is an oblique projection that shows a winding body that constitutes part of a winding assembly in the rotary electric machine according to Embodiment 2 of the present invention.
Figure 34:
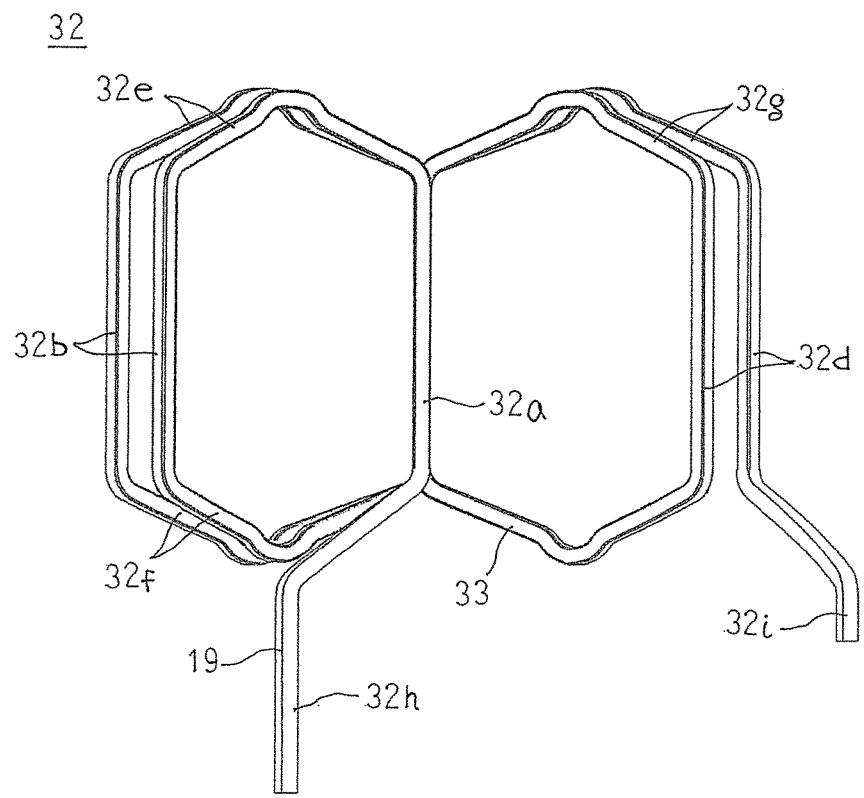
FIG. 34 is a front elevation that shows the winding body that constitutes part of the winding assembly in the rotary electric machine according to Embodiment 2 of the present invention.
Figure 35:
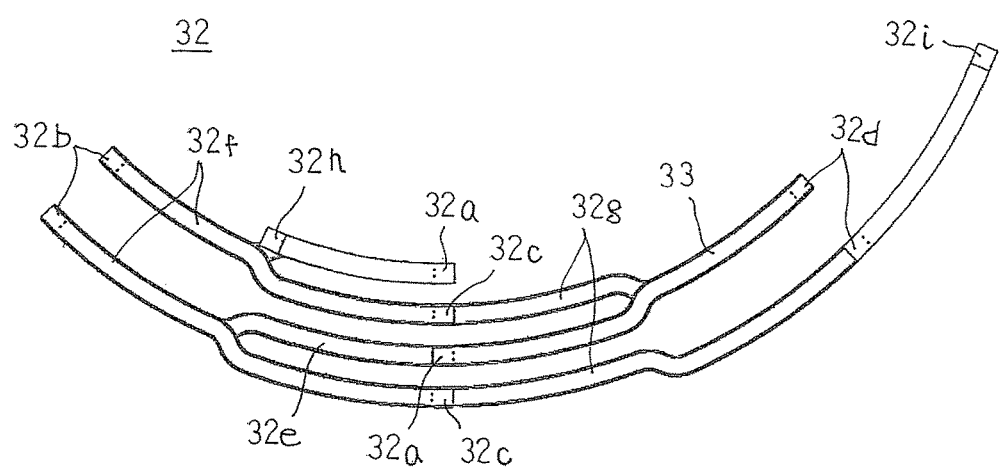
FIG. 35 is a diagram of the winding body that constitutes part of the winding assembly in the rotary electric machine according to Embodiment 2 of the present invention when viewed from a vicinity of second coil ends.
Figure 36:
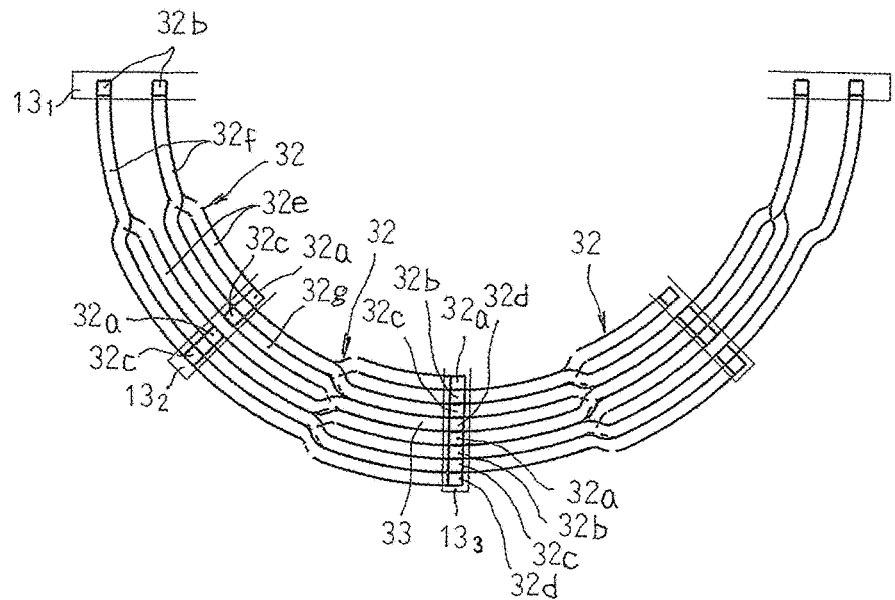
FIG. 36 is a partial end elevation of a state in which three winding bodies are mounted into the stator core so as to share a single slot in the rotary electric machine according to Embodiment 2 of the present invention when viewed from the vicinity of the second coil ends.
Figure 37:
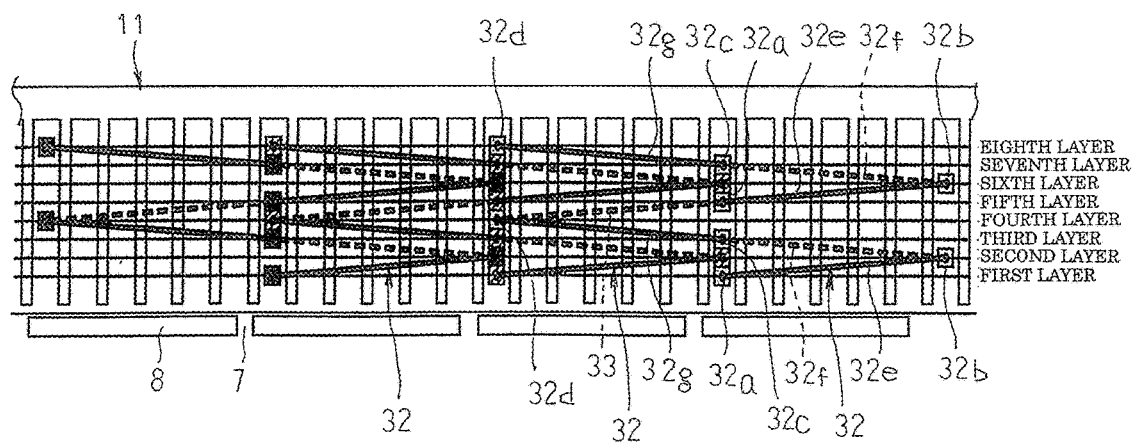
FIG. 37 is a developed projection of the state in which three winding bodies are mounted into the stator core so as to share a single slot in the rotary electric machine according to Embodiment 2 of the present invention when viewed from the vicinity of the second coil ends.
Figure 38:
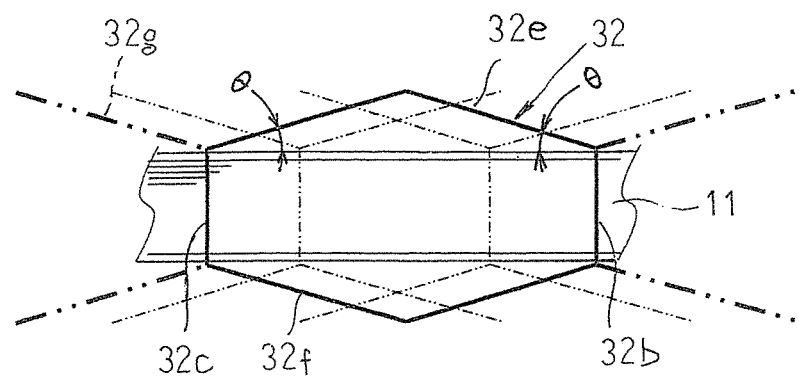
FIG. 38 is a developed projection that shows a winding body that is mounted to the stator core in the rotary electric machine according to Embodiment 2 of the present invention viewed from radially outside.
Figure 39:
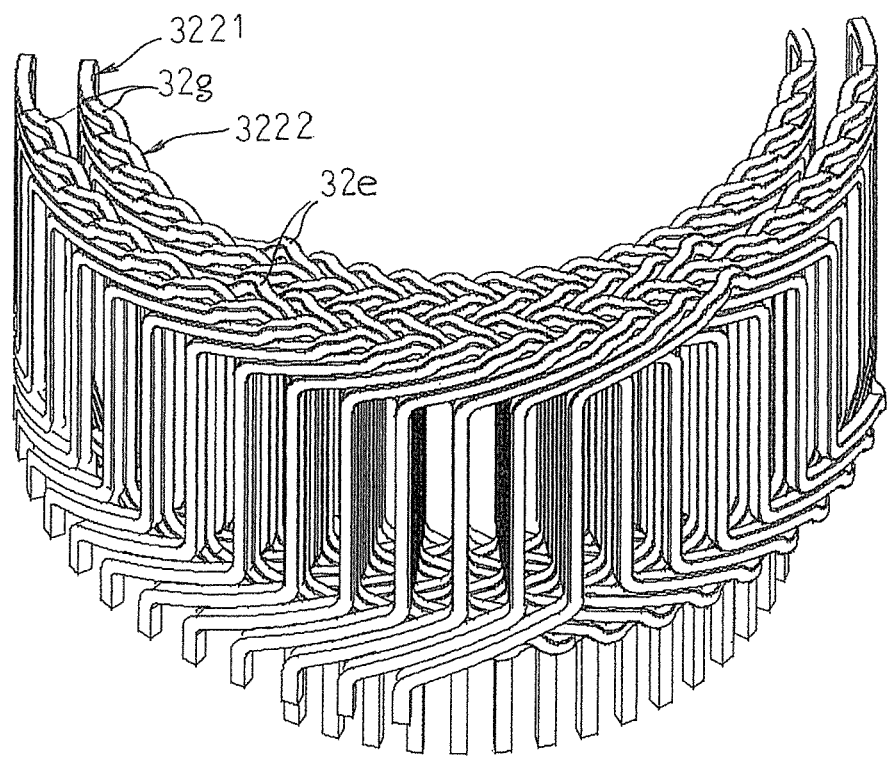
FIG. 39 is an oblique projection that shows a state in which sixteen winding bodies are arranged at a pitch of one slot in the circumferential direction in the rotary electric machine according to Embodiment 2 of the present invention.
Figure 40:
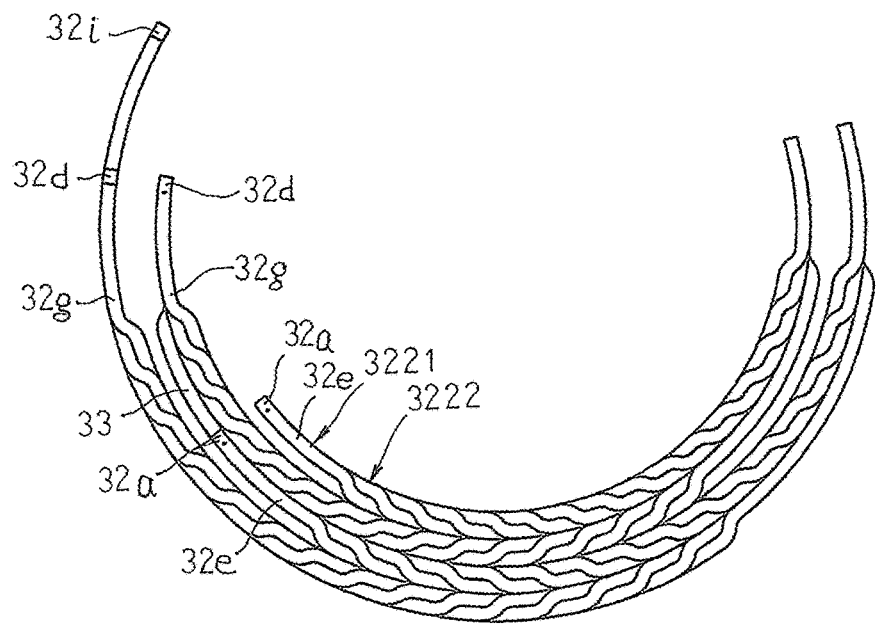
FIG. 40 is an end elevation that shows the state in which the sixteen winding bodies are arranged at a pitch of one slot in the circumferential direction in the rotary electric machine according to Embodiment 2 of the present invention when viewed from a vicinity of first coil ends.

FIG. 30 is an oblique projection that shows part of a rotary electric machine according to Embodiment 2 of the present invention, FIG. 31 is an oblique projection that shows a stator that is used in the rotary electric machine according to Embodiment 2 of the present invention, FIG. 32 is an oblique projection that shows a winding assembly that constitutes part of a stator winding of the stator that is used in the rotary electric machine according to Embodiment 2 of the present invention, FIG. 33 is an oblique projection that shows a winding body that constitutes part of a winding assembly in the rotary electric machine according to Embodiment 2 of the present invention, FIG. 34 is a front elevation that shows the winding body that constitutes part of the winding assembly in the rotary electric machine according to Embodiment 2 of the present invention, FIG. 35 is a diagram of the winding body that constitutes part of the winding assembly in the rotary electric machine according to Embodiment 2 of the present invention when viewed from a vicinity of second coil ends, FIG. 36 is a partial end elevation of a state in which three winding bodies are mounted into the stator core so as to share a single slot in the rotary electric machine according to Embodiment 2 of the present invention when viewed from the vicinity of the second coil ends, FIG. 37 is a developed projection of the state in which three winding bodies are mounted into the stator core so as to share a single slot in the rotary electric machine according to Embodiment 2 of the present invention when viewed from the vicinity of the second coil ends, FIG. 38 is a developed projection that shows a winding body that is mounted to the stator core in the rotary electric machine according to Embodiment 2 of the present invention viewed from radially outside, FIG. 39 is an oblique projection that shows a state in which sixteen winding bodies are arranged at a pitch of one slot in the circumferential direction in the rotary electric machine according to Embodiment 2 of the present invention, and FIG. 40 is an end elevation that shows a state in which sixteen winding bodies are arranged at a pitch of one slot in the circumferential direction in the rotary electric machine according to Embodiment 2 of the present invention when viewed from a vicinity of first coil ends. Moreover, for simplicity, coil end portions are represented as straight lines in FIG. 37.

In FIGS. 30 and 31, a rotary electric machine 100A includes: a stator 10A; and a rotor 5 that is rotatably disposed on an inner circumferential side of the stator 10A. The stator 10A includes: a stator core 11; and a stator winding 30 that is mounted to the stator core 11.

The stator winding 30 is configured by applying a connection process to a winding assembly 31 that is mounted onto the stator core 11. As shown in FIG. 32, the winding assembly 31 is configured by arranging winding bodies 22 that are housed in sets of three slots 13 that are circumferentially consecutive at an angular spacing of six slots. Winding ends 32h each project axially outward in the vicinity of the second coil ends, and are arranged on a radially inner side of the winding assembly 31 at a pitch of one slot circumferentially, and winding ends 32i (described below) each project axially outward in the vicinity of the second coil ends, and are arranged on a radially outer side of the winding assembly 31 at a pitch of one slot circumferentially. The connection process is applied to the winding ends 32h and 32i of the winding assembly 31.

The winding bodies 32 are produced by winding a conductor wire 19 for two turns in a δ-shaped coil pattern in an edgewise winding. Specifically, as shown in FIGS. 33 through 35, the winding bodies 32 are configured such that two δ-shaped coil patterns that are formed by a first rectilinear portion 32a, a first coil end portion 32e, a second rectilinear portion 32b, a second coil end portion 32f, a third rectilinear portion 32c, a third coil end portion 32g, and a fourth rectilinear portion 32d are arranged in a longitudinal direction of short sides of the oblong cross sections of the conductor wire 19, and the fourth rectilinear portion 32d and the first rectilinear portion 32a are linked using a crossover wire 33. In other words, the winding body 32 is equivalent to a winding body that is configured by linking winding bodies 22 that are arranged in two layers in a longitudinal direction of the short sides of the oblong cross sections of the conductor wire 19 using the crossover wire 33. The crossover wires 33 constitute coil end portions, winding start end portions of the conductor wires 19 constitute winding ends 32h that function as first conductor terminals, and winding finish end portions constitute winding ends 32i that function as second conductor terminals.

In winding bodies 32 that are configured in this manner, four first rectilinear portions 32a and third rectilinear portions 32c are arranged in a single column such that longitudinal directions of long sides of the oblong cross sections are oriented in a circumferential direction so as to leave gaps d in the longitudinal direction of the short sides of the oblong cross sections. Two second rectilinear portions 32b are arranged so as to be separated by an angular spacing of six slots in a first circumferential direction from the column of the first rectilinear portions 32a and the third rectilinear portions 32c such that longitudinal directions of long sides of the oblong cross sections are oriented in a circumferential direction so as to leave a gap 3d in the longitudinal direction of the short sides of the oblong cross sections. Two fourth rectilinear portions 32d are arranged so as to be separated by an angular spacing of six slots in a second circumferential direction from the column of the first rectilinear portions 32a and the third rectilinear portions 32c such that longitudinal directions of long sides of the oblong cross sections are oriented in a circumferential direction so as to leave a gap 3d in the longitudinal direction of the short sides of the oblong cross sections.

FIGS. 36 and 37 show a state in which three winding bodies 32 are each mounted into the stator core 11 so as to share one slot 13, and FIG. 38 shows the state in which the winding bodies 32 are mounted into the stator core when viewed from radially outside. Here, three slots 13 that line up at an angular spacing of six slots circumferentially will be designated a first slot $13_1$, a second slot $13_2$, and a third slot $13_3$.

Focusing on one winding body 32, a first coil end portion 32e that extends outward at a second axial end (a vicinity of the first coil ends) from a first rectilinear portion 32a in a first layer from a slot opening side of a second slot $13_2$ extends toward a first slot $13_1$ circumferentially at an angle of inclination θ, is shifted radially outward at a vertex portion by a distance d, subsequently extends toward the first slot $13_1$ circumferentially at a reverse angle of inclination θ, and is linked to a second rectilinear portion 32b in a second layer from a slot opening side of the first slot $13_1$. Next, a second coil end portion 32f that extends outward at a first axial end (a vicinity of the second coil ends) from the second rectilinear portion 32b in the second layer from the slot opening side of the first slot $13_1$ extends toward the second slot $13_2$ circumferentially at an angle of inclination θ, is shifted radially outward at a vertex portion by a distance d, subsequently extends toward the second slot $13_2$ circumferentially at a reverse angle of inclination θ, and is linked to a third rectilinear portion 32c in a third layer from the slot opening side of the second slot $13_2$.

Next, a third coil end portion 32g that extends outward in the vicinity of the first coil ends from the third rectilinear portion 32c in the third layer from the slot opening side of the second slot $13_2$ extends toward a third slot $13_3$ circumferentially at an angle of inclination θ, is shifted radially outward at a vertex portion by a distance d, subsequently extends toward the third slot $13_3$ circumferentially at a reverse angle of inclination θ, and is linked to a fourth rectilinear portion 32d in a fourth layer from a slot opening side of the third slot $13_3$.

Next, a crossover wire 33 that extends outward in the vicinity of the second coil ends from the fourth rectilinear portion 32d in the fourth layer from the slot opening side of the third slot $13_3$ extends toward the second slot $13_2$ circumferentially at an angle of inclination θ, is shifted radially outward at a vertex portion by a distance d, subsequently extends toward the second slot $13_2$ circumferentially at a reverse angle of inclination θ, and is linked to a first rectilinear portion 32a in a fifth layer from the slot opening side of the second slot $13_2$. A first coil end portion 32e that extends outward in the vicinity of the first coil ends from the first rectilinear portion 32a in the fifth layer from the slot opening side of the second slot $13_2$ extends toward a first slot $13_1$ circumferentially at an angle of inclination θ, is shifted radially outward at a vertex portion by a distance d, subsequently extends toward the first slot $13_1$ circumferentially at a reverse angle of inclination θ, and is linked to a second rectilinear portion 32b in a sixth layer from the slot opening side of the first slot $13_1$.

Next, a second coil end portion 32f that extends outward in the vicinity of the second coil ends from the second rectilinear portion 32b in the sixth layer from the slot opening side of the first slot $13_1$ extends toward the second slot $13_2$ circumferentially at an angle of inclination θ, is shifted radially outward at a vertex portion by a distance d, subsequently extends toward the second slot $13_2$ circumferentially at a reverse angle of inclination θ, and is linked to a third rectilinear portion 32c in a seventh layer from the slot opening side of the second slot $13_2$. Next, a third coil end portion 32g that extends outward in the vicinity of the first coil ends from the third rectilinear portion 32c in the seventh layer from the slot opening side of the second slot $13_2$ extends toward a third slot $13_3$ circumferentially at an angle of inclination θ, is shifted radially outward at a vertex portion by a distance d, subsequently extends toward the third slot $13_3$ circumferentially at a reverse angle of inclination θ, and is linked to a fourth rectilinear portion 32d in an eighth layer from a slot opening side of the third slot $13_3$.

Thus, the first rectilinear portion 32a in the first layer of the second slot $13_2$ and the second rectilinear portion 32b in the second layer of the first slot $13_1$ are linked by the first coil end portion 32e, the second rectilinear portion 32b in the second layer of the first slot $13_1$ and the third rectilinear portion 32c in the third layer of the first slot $13_1$ are linked by the second coil end portion 32f, and the third rectilinear portion 32c in the third layer of the second slot $13_2$ and the fourth rectilinear portion 32d in the fourth layer of the third slot $13_3$ are linked by the third coil end portion 32g, to form the δ-shaped coil pattern.

In addition, the first rectilinear portion 32a in the fifth layer of the second slot $13_2$ and the second rectilinear portion 32b in the sixth layer of the first slot $13_1$ are linked by the first coil end portion 32e, the second rectilinear portion 32b in the sixth layer of the first slot $13_1$ and the third rectilinear portion 32c in the seventh layer of the first slot $13_1$ are linked by the second coil end portion 32f, and the third rectilinear portion 32c in the seventh layer of the second slot $13_2$ and the fourth rectilinear portion 32d in the eighth layer of the third slot $13_3$ are linked by the third coil end portion 32g, to form the δ-shaped coil pattern.

Thus, the winding body 32 is configured by linking the two δ-shaped coil patterns using a crossover wire 33 so as to be arranged into two layers in a radial direction. In the first through third coil end portions 32e, 32f, and 32g and the crossover wire 33, inclined portions that extend from the end portions of the first through fourth rectilinear portions 32a, 32b, 32c, and 32d to the vertex portion are formed so as to have an approximate circular arc shape when viewed from an axial direction. The first through fourth rectilinear portions 32a, 32b, 32c, and 32d are housed in a slot 13 that is shared by three winding bodies 32 such that the longitudinal directions of the long sides of the oblong cross sections of the conductor wires are oriented circumferentially so as to line up in a single column in a radial direction. The first and third coil end portions 32e and 32g are positioned radially further outward than tip end surfaces of the teeth 12b of the stator core 11, and are positioned radially further inward than bottom portions of the slots 13, as shown in FIG. 33.

A state in which the winding bodies 32 are arranged at a pitch of one slot will now be explained with reference to FIGS. 39 and 40. FIGS. 39 and 40 show a state in which sixteen winding bodies 32 are arranged at a pitch of one slot in a circumferential direction.

In FIGS. 39 and 40, the first coil end portion 32e that extends outward from the first rectilinear portion 32a that is positioned in the first layer from a radially inner side of the winding body 3221 that is disposed at the left end extends counterclockwise circumferentially so as to pass over the first coil end portion 32e that extends outward from the first rectilinear portion 32a that is positioned in the first layer from a radially inner side of the winding body 3222 that is adjacent counterclockwise, is shifted at the vertex portion radially outward by a distance d, extends counterclockwise circumferentially so as to pass under the first coil end portion 32e of the winding body 3222 that is adjacent counterclockwise, and is connected to a second rectilinear portion 32b.

Although not depicted, at a rear surface in FIG. 40, the second coil end portion 32f that extends outward from the second rectilinear portion 32b of the winding body 3221 extends clockwise circumferentially so as to pass under the second coil end portion 32f that extends outward from the second rectilinear portion 32b of the winding body 3222 that is adjacent counterclockwise, emerges before the vertex portion, shifts at the vertex portion by a distance d radially outward, extends circumferentially clockwise so as to pass over the second coil end portion 32f of the winding body 3222 that is adjacent counterclockwise, and is connected to a third rectilinear portion 32c.

The third coil end portion 32g that extends outward from the third rectilinear portion 32c of the winding body 3221 extends clockwise circumferentially so as to pass under the third coil portion 32g that extends outward from the third rectilinear portion 32c of the winding body 3222, emerges before the vertex portion, shifts at the vertex portion by a distance d radially outward, extends circumferentially clockwise so as to pass over the third coil end portion 32g of the winding body 3222 that is adjacent counterclockwise, and is connected to a fourth rectilinear portion 32d.

Although not depicted, at a rear surface in FIG. 37, the crossover wire 33 that extends outward from the fourth rectilinear portion 32d of the winding body 3221 extends counterclockwise circumferentially so as to pass under the crossover wire 33 that extends outward from the fourth rectilinear portion 32d of the winding body 3222 that is adjacent counterclockwise, emerges before the vertex portion, shifts at the vertex portion by a distance d radially outward, extends circumferentially counterclockwise so as to pass over the crossover wire 33 of the winding body 3222 that is adjacent counterclockwise, and is connected to a first rectilinear portion 32a that is positioned in a fifth layer from the radially inner side.

Moreover, because the first rectilinear portions 32a, the first coil end portions 32e, the second rectilinear portions 32b, the second coil end portions 32f, the third rectilinear portions 32c, the third coil end portions 32g, and the fourth rectilinear portions 32d in the fifth layer through the eighth layer from the radially inner side of the winding bodies 32 are configured in a similar manner, explanation thereof will be omitted here.

As shown in FIGS. 39 and 40, because the first through fourth rectilinear portions 32a, 32b, 32c, and 32d are shifted by a distance d radially at each of the vertex portions, the sixteen winding bodies 32 can be arranged at a pitch of one slot in a circumferential direction without interfering with each other. A winding assembly 31 that is shown in FIG. 32 is assembled by arranging forty-eight winding bodies 32 at a pitch of one slot circumferentially. In this winding assembly 31, forty-eight columns of eight first through fourth rectilinear portions 32a, 32b, 32c, and 32d that are lined up in a single column radially are arranged circumferentially at a pitch of one slot. The respective columns of eight first through fourth rectilinear portions 32a, 32b, 32c, and 32d that are lined up in a single column radially are housed in each of the slots 13.

Figure 41:
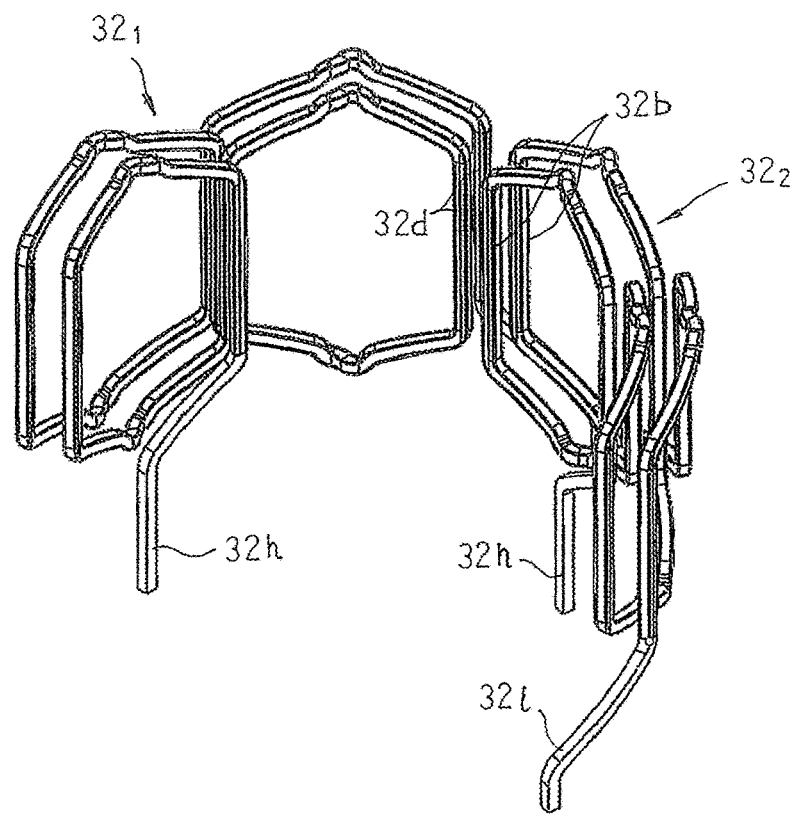
FIG. 41 is an oblique projection that explains the method for assembling a winding assembly in the rotary electric machine according to Embodiment 2 of the present invention.
Figure 42:
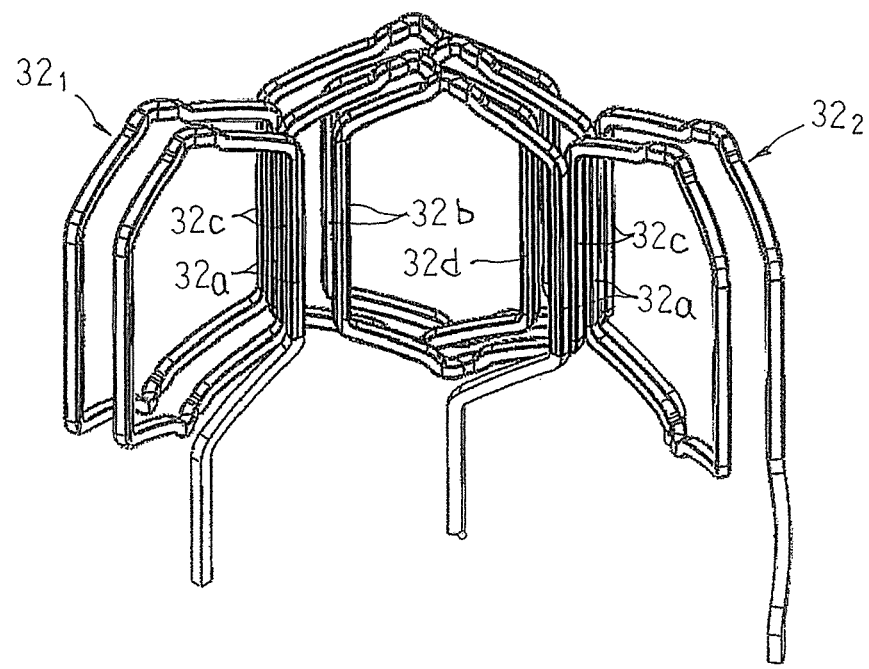
FIG. 42 is an oblique projection that explains the method for assembling a winding assembly in the rotary electric machine according to Embodiment 2 of the present invention.
Figure 43:
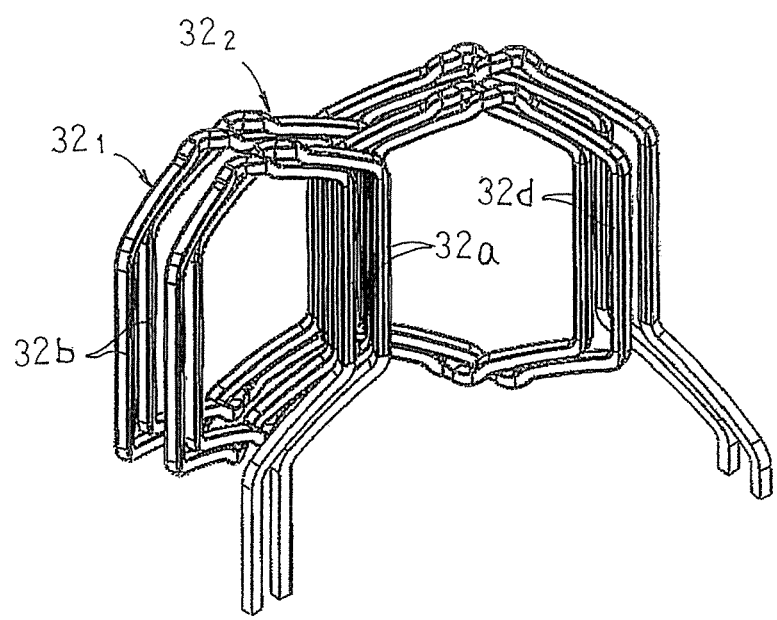
FIG. 43 is an oblique projection that explains the method for assembling a winding assembly in the rotary electric machine according to Embodiment 2 of the present invention.

Next, a method for assembling the winding assembly 31 will be explained with reference to the drawings. FIGS. 41 through 43 are oblique projections that explain a method for assembling the winding assembly in the rotary electric machine according to Embodiment 2 of the present invention, and FIGS. 44 through 48 are schematic diagrams that explain the method for assembling the winding assembly in the rotary electric machine according to Embodiment 2 of the present invention.

First, winding bodies 32 are produced by continuously winding conductor wires 19 for two turns into the δ-shaped coil pattern. Here, to facilitate explanation, the winding bodies 32 are designated winding body 32$_1$, winding body 32$_2$, winding body 32$_3$, winding body 32$_{47}$, and winding body 32$_{48}$ in order of mounting.

Figure 44:
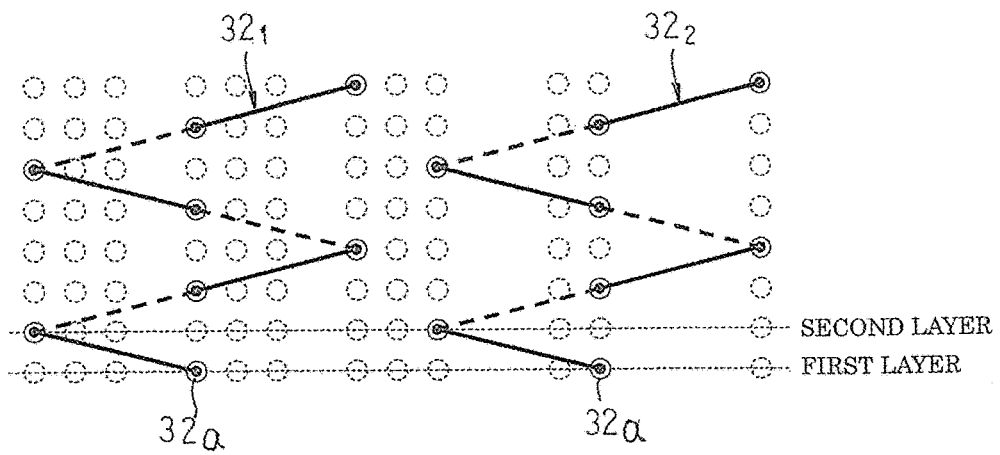
FIG. 44 is a schematic diagram that explains a method for assembling the winding assembly in the rotary electric machine according to Embodiment 2 of the present invention.
Figure 45:
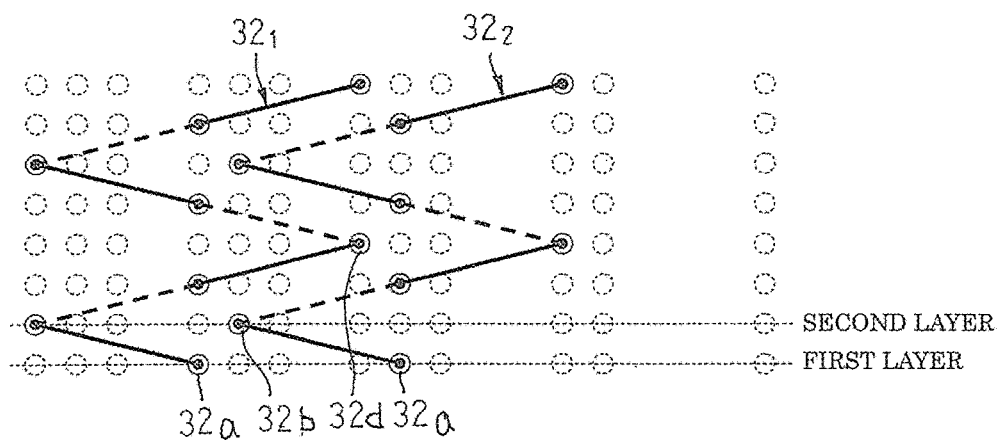
FIG. 45 is a schematic diagram that explains the method for assembling the winding assembly in the rotary electric machine according to Embodiment 2 of the present invention.
Figure 46:
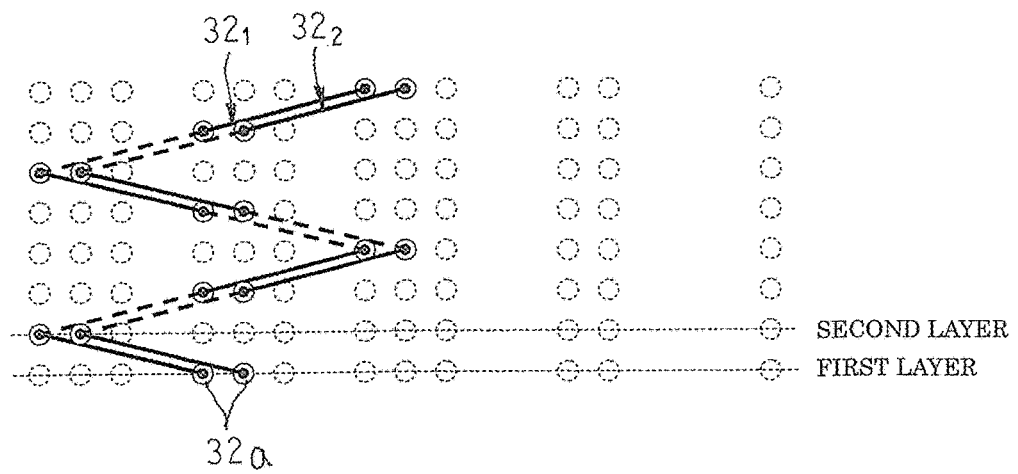
FIG. 46 is a schematic diagram that explains the method for assembling the winding assembly in the rotary electric machine according to Embodiment 2 of the present invention.

Then, as shown in FIGS. 41 and 44, the first and second winding bodies 32$_1$ and 32$_2$ are placed circumferentially adjacent to each other so as to align axial height positions. Next, as shown in FIGS. 42 and 45, the second rectilinear portion 32$b$ on a radially outer side of the second winding body 32$_2$ is inserted between the fourth rectilinear portions 32$d$ of the first winding body 32$_1$. Next, the second winding body 32$_2$ is moved circumferentially until the second rectilinear portion 32$b$ of the second winding body 32$_2$ is at a position that is separated by a pitch of one slot (the angle between the slots) from the second rectilinear portion 32$b$ of the first winding body 32$_1$. The two winding bodies 32$_1$ and 32$_2$ are thereby assembled as shown in FIGS. 43 and 46. In the assemblage of the two winding bodies 32$_1$ and 32$_2$, the conductor wire 19 of the winding body 32$_2$ enters the gaps between the conductor wire 19 of the winding body 32$_1$, overlapping with each other radially and increasing rigidity.

Figure 47:
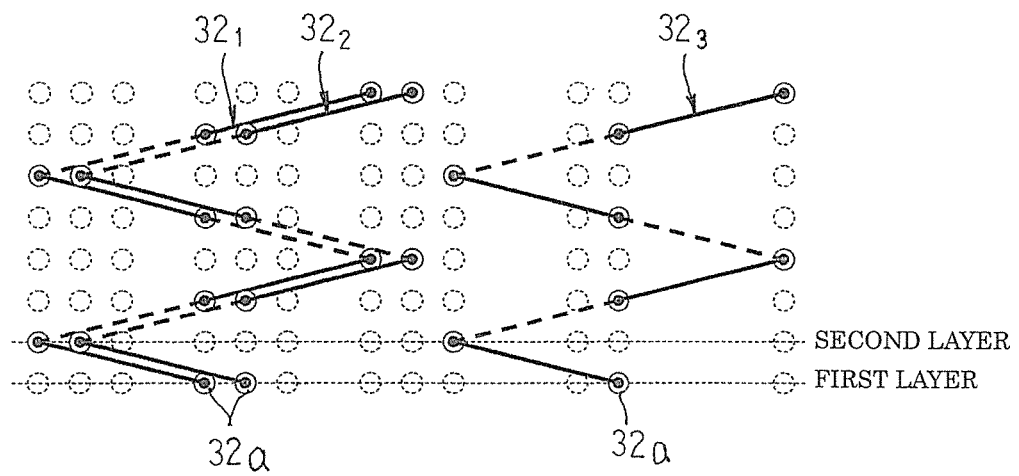
FIG. 47 is a schematic diagram that explains the method for assembling the winding assembly in the rotary electric machine according to Embodiment 2 of the present invention.
Figure 48:
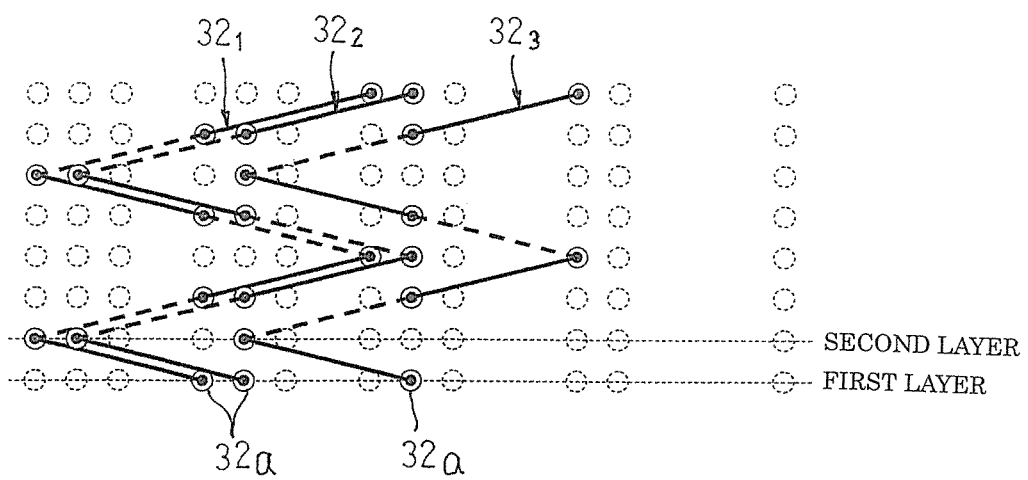
FIG. 48 is a schematic diagram that explains the method for assembling the winding assembly in the rotary electric machine according to Embodiment 2 of the present invention.

Next, as shown in FIG. 47, the third winding body 32$_3$ is placed circumferentially adjacent to the assemblage of the two winding bodies 32$_1$ and 32$_2$ so as to align axial height positions. Next, as shown in FIG. 48, the second rectilinear portion 32$b$ on a radially outer side of the third winding body 32$_3$ is inserted between the fourth rectilinear portions 32$d$ of the winding bodies 32$_1$ and 32$_2$. Next, the third winding body 32$_3$ is moved circumferentially until the second rectilinear portion 32$b$ of the third winding body 32$_3$ is at a position that is separated by a pitch of one slot (the angle between the slots) from the second rectilinear portion 32$b$ of the second winding body 32$_2$. The three winding bodies 32$_1$, 32$_2$, and 32$_3$ are assembled thereby.

Thus, in a similar manner to Embodiment 1 above, the forty-eight winding bodies 32 are assembled by aligning axial height positions of the winding bodies 32 and sequentially moving them circumferentially, to assemble the annular winding assembly 31. Next, forty-eight core blocks 12 are mounted into the winding assembly 31 in a similar manner to Embodiment 1 above. In addition, the stator winding 30 is configured by connecting the winding assembly 31, producing the stator 10A.

In the rotary electric machine 100A that is configured in this manner, a stator winding 30 is constituted by a winding assembly 31 that is configured such that winding bodies 32 that are produced by continuously winding conductor wires 19 for two turns into a δ-shaped coil pattern are arranged at a pitch of one slot circumferentially. The winding body 32 is equivalent to a winding body that is configured by linking winding bodies 22 that are arranged in two layers in a longitudinal direction of the short sides of the oblong cross sections of the conductor wire 19 using the crossover wire 33. Consequently, similar or identical effects to those in Embodiment 1 above, are also exhibited in Embodiment 2. In particular, because the winding bodies 32 are configured such that vertex portions of first through third coil end portions 32$e$, 32$f$, and 32$g$ and the crossover wires 33 are shifted in a radial direction by a gap d that is approximately equal to the radial dimensions of the first through fourth rectilinear portions 32$a$, 32$b$, 32$c$, and 32$d$, the bending radius at the vertex portions is reduced compared to the stator winding that is described in Patent Literature 1. Thus, radial and axial dimensions of the coil ends are reduced, enabling reductions in the size of the rotary electric machine 100A to be achieved.

Figure 49:
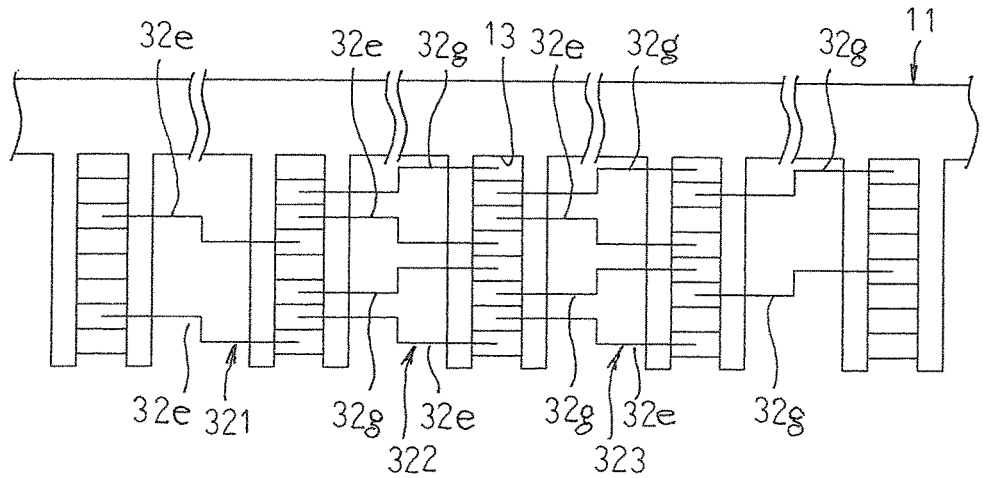
FIG. 49 is a schematic diagram of a state in which three winding bodies are mounted into an identical slot group in the stator for a rotary electric machine according to Embodiment 2 of the present invention when viewed from the vicinity of the first coil ends.
Figure 50:
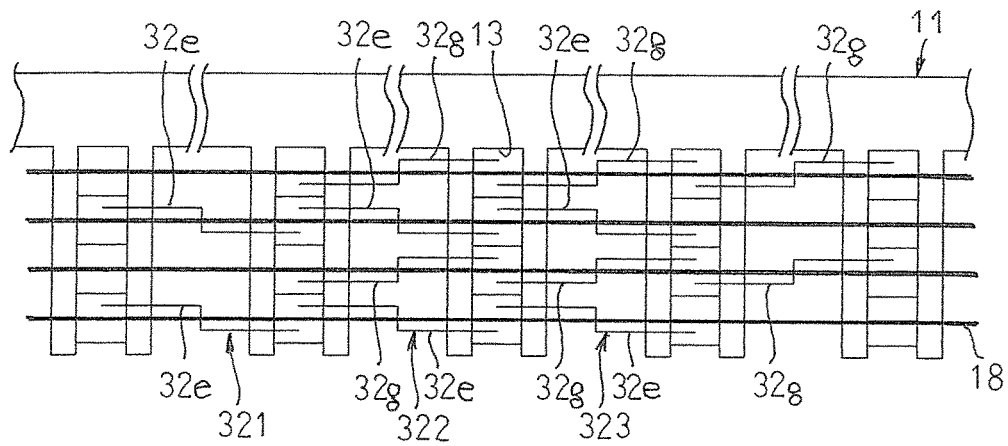
FIG. 50 is a schematic diagram that explains arrangement of insulating papers in the vicinity of the first coil ends in the stator for a rotary electric machine according to Embodiment 2 of the present invention.
Figure 51:
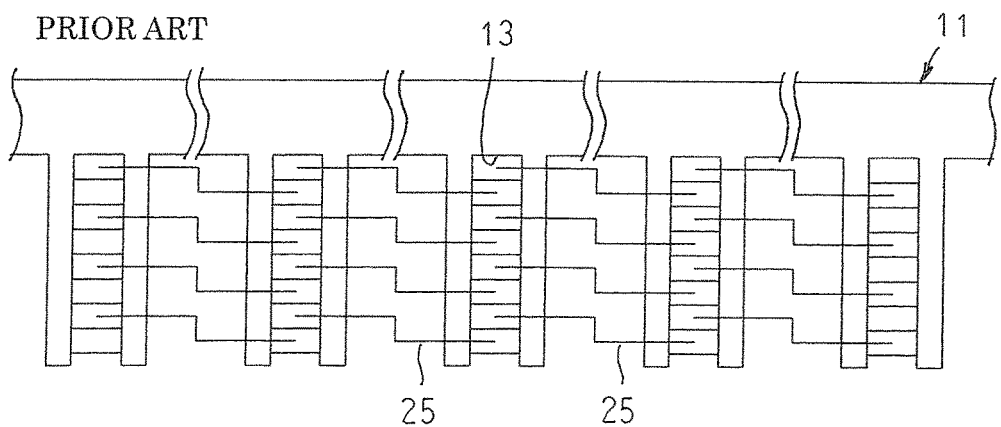
FIG. 51 is a schematic diagram of a state in which a stator winding is mounted in a conventional stator for a rotary electric machine when viewed from a vicinity of first coil ends.
Figure 52:
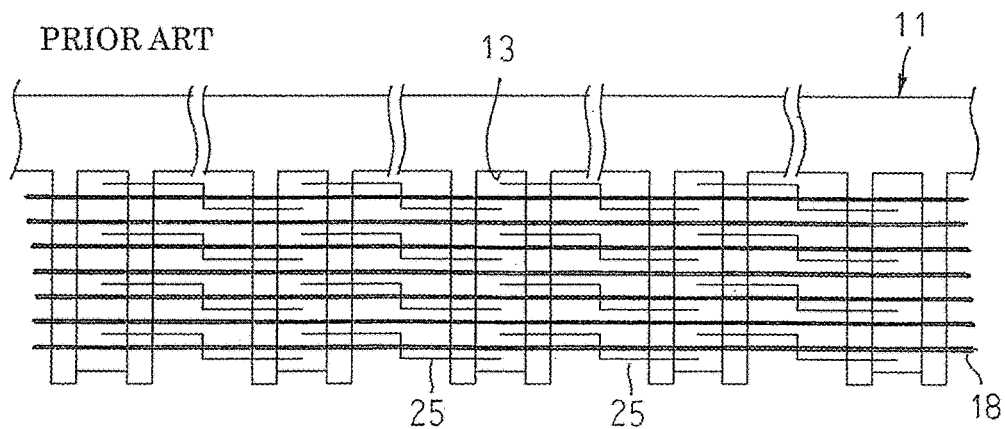
FIG. 52 is a schematic diagram that explains arrangement of insulating papers in the vicinity of the first coil ends in the conventional stator for a rotary electric machine.
Figure 53:
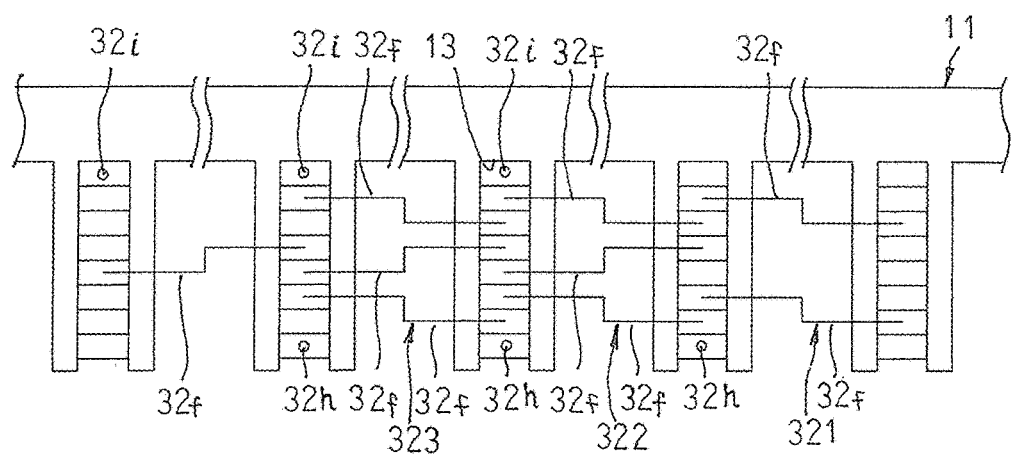
FIG. 53 is a schematic diagram of a state in which three winding bodies are mounted into an identical slot group in the stator for a rotary electric machine according to Embodiment 2 of the present invention when viewed from the vicinity of the second coil ends.
Figure 54:
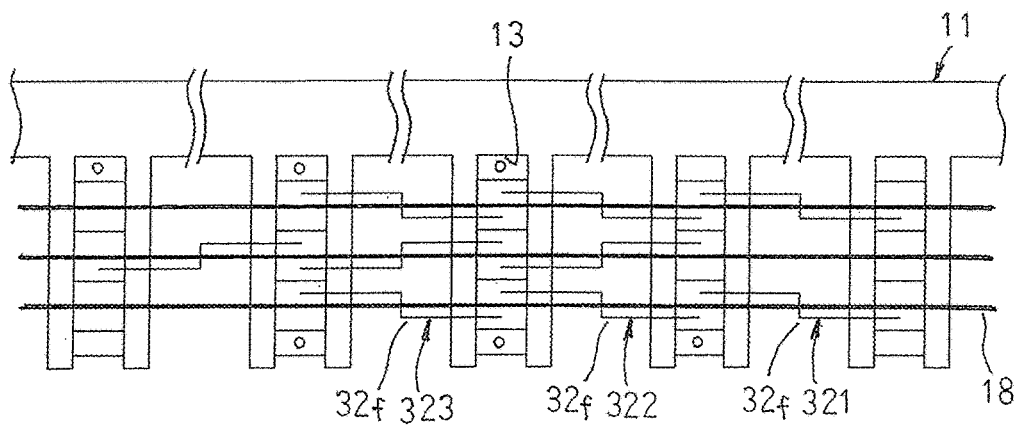
FIG. 54 is a schematic diagram that explains arrangement of insulating papers in the vicinity of the second coil ends in the stator for a rotary electric machine according to Embodiment 2 of the present invention.

Next, the insulating construction of the stator winding 30 will be explained. FIG. 49 is a schematic diagram of a state in which three winding bodies are mounted into an identical slot group in the stator for a rotary electric machine according to Embodiment 2 of the present invention when viewed from the vicinity of the first coil ends, FIG. 50 is a schematic diagram that explains arrangement of insulating papers in the vicinity of the first coil ends in the stator for a rotary electric machine according to Embodiment 2 of the present invention, FIG. 51 is a schematic diagram of a state in which a stator winding is mounted in a conventional stator for a rotary electric machine when viewed from a vicinity of first coil ends, FIG. 52 is a schematic diagram that explains arrangement of insulating papers in the vicinity of the first coil ends in the conventional stator for a rotary electric machine, FIG. 53 is a schematic diagram of a state in which three winding bodies are mounted into an identical slot group in the stator for a rotary electric machine according to Embodiment 2 of the present invention when viewed from the vicinity of the second coil ends, and FIG. 54 is a schematic diagram that explains arrangement of insulating papers in the vicinity of the second coil ends in the stator for a rotary electric machine according to Embodiment 2 of the present invention.

In FIG. 49, in the vicinity of the first coil ends, focusing on one slot 13 that three winding bodies 32 share, a first coil end portion 32$e$ of the second winding body 32$_2$ extends outward in a first circumferential direction from the first layer from an inner radial side of the slot 13, a first coil end portion 32$e$ of the third winding body 32$_3$ extends outward in a second circumferential direction from the second layer from the inner radial side of the slot 13, a third coil end portion 32$g$ of the second winding body 32$_2$ extends outward in the second circumferential direction from the third layer from the inner radial side of the slot 13, and a third coil end portion 32$g$ of the first winding body 32$_1$ extends outward in the first circumferential direction from the fourth layer from the inner radial side of the slot 13. In addition, a first coil end portion 32$e$ of the second winding body 32$_2$ extends outward in a first circumferential direction from the fifth layer from an inner radial side of the slot 13, a first coil end portion 32$e$ of the third winding body 32$_3$ extends outward in a second circumferential-direction from the sixth layer from the inner radial side of the slot 13, a third coil end portion 32$g$ of the second winding body 32$_2$ extends outward in the second circumferential direction from the seventh layer from the inner radial side of the slot 13, and a third coil end portion 32$g$ of the first winding body 32$_1$ extends outward in the first circumferential direction from the eighth layer from the inner radial side of the slot 13.

From FIG. 49, it can be seen that the first and third coil end portions 32$e$ and 32$g$ in the second layer and the third layer of the slot 13 extend outward from the slot 13 in a like circumferential direction. Similarly, it can be seen that the first and third coil end portions 32$e$ and 32$g$ in the fourth layer and the fifth layer of the slot 13 extend outward from the slot 13 in a like circumferential direction, and the first and third coil end portions 32$e$ and 32$g$ in the sixth layer and the seventh layer extend outward from the slot 13 in a like circumferential direction. In other words, in the second layer and the third layer of the first coil ends, in the fourth layer and the fifth layer, and in the sixth layer and the seventh layer, same-phase coil end portions are disposed so as to be radially adjacent, and the electric potential difference between the coil end portions is small.

From FIG. 49, it can be seen that the first coil end portions 32e in the first layer and the second layer of the slot 13 extend outward from the slot 13 in opposite circumferential directions, that the third coil end portions 32g in the third layer and the fourth layer of the slot 13 extend outward from the slot 13 in opposite circumferential directions, that the first coil end portions 32e in the fifth layer and the sixth layer of the slot 13 extend outward from the slot 13 in opposite circumferential directions, and that the third coil end portions 32g in the seventh layer and the eighth layer of the slot 13 extend outward from the slot 13 in opposite circumferential directions. In other words, in the first layer and the second layer of the first coil ends, in the third layer and the fourth layer, in the fifth layer and the sixth layer, and in the seventh layer and the eighth layer, different-phase coil end portions cross each other in a radial direction, and the electric potential difference between the coil end portions is large.

From the above, in the first coil ends, it is necessary to increase the voltage tolerance of the insulation between the first coil end portions 32e in the first layer and the second layer, between the third coil end portions 32g in the third layer and the fourth layer, between the first coil end portions 32e in the fifth layer and the sixth layer, and between the third coil end portions 32g in the seventh layer and the eighth layer. Thus, insulation performance is ensured by setting the thickness of the insulating coating of the conductor wire 19 such that dielectric breakdown does not occur due to electric potential differences between same-phase coils, and by disposing insulating papers 18 between the first coil end portions 32e in the first layer and the second layer, between the third coil end portions 32g in the third layer and the fourth layer, between the first coil end portions 32e in the fifth layer and the sixth layer, and between the third coil end portions 32g in the seventh layer and the eighth layer, as shown in FIG. 50. Thus, the insulating coating of the conductor wire 19 does not become excessively thick, enabling reductions in the space factor inside the slots 13 to be suppressed.

Now, in the rotary electric machine according to Patent Literature 2, because the stator winding is formed using wave windings, the coil end portions 25 extend outward in the first circumferential direction from the first layer, the third layer, the fifth layer, and the seventh layer of the slots 13, and extend outward in the second circumferential direction from the second layer, the fourth layer, the sixth layer, and the eighth layer, as shown in FIG. 51. Different-phase coil end portions 25 cross each other in a radial direction between each of the layers of the coil ends, making the electric potential differences between the coil end portions 25 greater. Thus, it is necessary to ensure interphase insulation by disposing insulating papers 18 between the coil end portions 25 in each of the layers of the coil ends, as shown in FIG. 52.

Consequently, according to Embodiment 2, insulating papers 18 that are disposed between the second layer and the third layer of the first coil ends, between the fourth layer and the fifth layer, and between the sixth layer and the seventh layer, are no longer required compared to Patent Literature 2, enabling radial dimensions of the first coil ends to be reduced proportionately.

In the vicinity of the second ends, as shown in FIG. 53, focusing on one slot 13 that three winding bodies 32 share, second coil end portions 32f of the third winding body $32_3$ extend outward in a first circumferential direction from the second layer and the sixth layer from an inner radial side of the slot 13, second coil end portions 32f of the second winding body $32_2$ and the first winding body $32_2$ extend outward in a second circumferential direction from the third layer, the fourth layer, and the seventh layer from the inner radial side of the slot 13, and a second coil end portion 32f of the second winding body $32_2$ extends outward in the first circumferential direction from the fifth layer from the inner radial side of the slot 13.

Thus, in the vicinity of the second coil ends, the second coil end portions 32f of different winding bodies 32 extend outward in opposite circumferential directions from the second layer and the third layer from radially inner sides of the slots 13. Similarly, the second coil end portions 32f of different winding bodies 32 extend outward in opposite circumferential directions from the fourth layer and the fifth layer from radially inner sides of the slots 13, and from the sixth layer and the seventh layer. In other words, in the second layer and the third layer of the second coil ends, in the fourth layer and the fifth layer, and in the sixth layer and the seventh layer, different-phase second coil end portions 32f cross each other in a radial direction, and the electric potential difference between the coil end portions is large.

From the above, in the second coil ends, it is necessary to increase the voltage tolerance of the insulation between the second coil end portions 32f in the second layer and the third layer, between the second coil end portions 32f in the fourth layer and the fifth layer, and between the second coil end portions 32f in the sixth layer and the seventh layer. Thus, as shown in FIG. 54, insulation performance is ensured by disposing insulating papers 18 between the second coil end portions 32f in the second layer and the third layer, between the second coil end portions 32f in the fourth layer and the fifth layer, and between the second coil end portions 32f in the sixth layer and the seventh layer.

Consequently, according to Embodiment 2, insulating papers 18 that are disposed between the first layer and the second layer of the second coil ends, between the third layer and the fourth layer, between the fifth layer and the sixth layer, and between the seventh layer and the eight layer, are no longer required compared to Patent Literature 2, enabling radial dimensions of the second coil ends to be reduced proportionately.

Now, in Embodiment 2, the winding bodies 32 are produced by continuously winding conductor wires 19 into a δ-shaped coil pattern for two turns, but winding bodies may be produced by winding conductor wires into a δ-shaped coil pattern for three or more turns. In other words, winding bodies may be configured in series by arranging the δ-shaped coil patterns (winding bodies 22) in three or more layers in a radial direction, and linking together winding ends of three δ-shaped coil patterns using crossover wires.

Moreover, in each of the above embodiments, the winding bodies are produced using conductor wire that has an oblong cross section, but the cross sectional shape of the conductor wire that constitutes the winding bodies is not limited to an oblong shape, and conductor wire that has a circular cross section may be used, for example.

In each of the above embodiments, first through fourth rectilinear portions are arranged in a single column radially inside the slots such that longitudinal directions of long sides of the oblong cross sections are oriented circumferentially, but the first through fourth rectilinear portions may be arranged in a single column radially inside the slots such that longitudinal directions of short sides of the oblong cross sections are oriented circumferentially.

In each of the above embodiments, insulation between welded portions of winding ends of the winding bodies is not described at all, but an electrically insulating resin should be applied to the welded portions, for example. Because the conductor wires are insulated, there is no problem with insulation between the first through fourth rectilinear portions and the stator core, but if insulating paper, for example, is interposed between the first through fourth rectilinear portions and the inner circumferential surfaces of the slots, then insulation between the first through fourth rectilinear portions and the stator core is reliably ensured.

In each of the above embodiments, an inner-rotor electric motor has been explained, but similar or identical effects are also exhibited if the present invention is applied to an outer-rotor electric motor.

In each of the above embodiments, cases in which the present application has been applied to an electric motor have been explained, but similar or identical effects are also exhibited if the present application is applied to a generator.

In each of the above embodiments, an eight-pole forty-eight-slot rotary electric machine has been explained, but it goes without saying that the number of poles and the number of slots are not limited to eight poles and forty-eight slots. Furthermore, the slots are formed at a ratio of two slots per phase per pole, but the number of slots per phase per pole is not limited to two, and may be one, or may be three or greater.

In each of the above embodiments, the number of slots is formed at a ratio of two slots per phase per pole, and the spacing between the first and second rectilinear portions of the winding bodies is set to an angular spacing of six slots to configure the stator winding into a full-pitch winding, but the spacing between the first and second rectilinear portions of the winding bodies is not limited to an angular spacing of six slots. For example, if the spacing between the first and second rectilinear portions of the winding bodies is set to an angular spacing of five slots, the stator winding can be configured into a short-pitch winding.

The invention claimed is:

1. A stator for a rotary electric machine comprising:
   an annular stator core in which slots are arranged circumferentially; and
   a stator winding that is mounted to said stator core,
   wherein:
   said stator winding includes a plurality of winding bodies that are each produced by winding a jointless continuous conductor wire that is coated with insulation, and that are arranged at a pitch of one slot in a circumferential direction so as to be mounted into only a first slot, a second slot, and a third slot that line up at an angular spacing of n slots in a circumferential direction, where n is a natural number that is greater than or equal to 2;
   said winding bodies are configured by repeatedly winding a δ-shaped coil pattern that is formed by inserting said conductor wire sequentially into said first slot, said second slot, said third slot, and said second slot, so as to alternate an axial direction of insertion into said first slot, said second slot, and said third slot, for m turns in a radial direction, where m is a natural number that is greater than or equal to 1; and
   directions in which said conductor wires extend outward circumferentially at least one pair of housed positions of said conductor wires that are radially adjacent inside said slot are like directions.

2. The stator for a rotary electric machine according to claim 1, wherein said winding bodies include:
   rectilinear portions that are housed in said first slot, said second slot, and said third slot; and
   coil end portions that link together end portions of said rectilinear portions,
   housed positions of said rectilinear portions in a radial direction inside said first slot, said second slot, and said third slot, being shifted sequentially in a first radial direction by an amount equal to a radial thickness of said rectilinear portions sequentially in order of said first slot, said second slot, said third slot, and said second slot.

3. The stator for a rotary electric machine according to claim 2, wherein said rectilinear portions are housed in 4 m layers so as to be arranged in a single row in each of said slots, directions in which said coil end portions extend outward circumferentially from said rectilinear portions that are housed in said slots that are in adjacent layers being repeated radially so as to alternate between a like direction and an opposite direction.

4. The stator for a rotary electric machine according to claim 3, wherein in coil ends that are formed by said coil end portions that extend outward circumferentially from said rectilinear portions that are housed in said slots, an insulating paper is disposed only between coil end portions in which directions in which said coil end portions extend outward circumferentially from said rectilinear portions that are housed in said slots that are in adjacent layers are opposite directions.

5. The stator for a rotary electric machine according to claim 3, wherein in coil ends that are formed by said coil end portions that extend outward circumferentially from said rectilinear portions that are housed in said slots:
   a first insulating paper is disposed between coil end portions in which directions in which said coil end portions extend outward circumferentially from said rectilinear portions that are housed in said slots that are in adjacent layers are opposite directions; and
   a second insulating paper that is thinner than said first insulating paper is disposed between coil end portions in which directions in which said coil end portions extend outward circumferentially from said rectilinear portions that are housed in said slots that are in adjacent layers are like directions.

6. A stator for a rotary electric machine comprising:
   an annular stator core in which slots are arranged circumferentially; and
   a stator winding that is mounted to said stator core,
   wherein:
   said stator winding includes a plurality of winding bodies that are each produced by winding a jointless continuous conductor wire that is coated with insulation, and that are arranged at a pitch of one slot in a circumferential direction so as to be mounted into a first slot, a second slot, and a third slot that line up at an angular spacing of n slots in a circumferential direction, where n is a natural number that is greater than or equal to 2;
   said winding bodies are configured by repeatedly winding a δ-shaped coil pattern that is formed by inserting said conductor wire sequentially into said first slot, said second slot, said third slot, and said second slot, so as to alternate an axial direction of insertion into said first slot, said second slot, and said third slot, for m turns in a radial direction, where m is a natural number that is greater than or equal to 1; and
   said winding bodies include:
   rectilinear portions that are housed in said first slot, said second slot, and said third slot; and coil end portions that link together end portions of said rectilinear portions, housed positions of said rectilinear portions in a radial direction inside said first slot, said second slot, and said third slot, being shifted sequentially in a first radial direction by an amount equal to a radial thickness of said rectilinear portions sequentially in order of said first slot, said second slot, said third slot, and said second slot.

7. The stator for a rotary electric machine according to claim 6, wherein said rectilinear portions are housed in 4 m layers so as to be arranged in a single row in each of said slots, directions in which said coil end portions extend outward circumferentially from said rectilinear portions that are housed in said slots that are in adjacent layers being repeated radially so as to alternate between a like direction and an opposite direction.

8. The stator for a rotary electric machine according to claim 7, wherein in coil ends that are formed by said coil end portions that extend outward circumferentially from said rectilinear portions that are housed in said slots, an insulating paper is disposed only between coil end portions in which directions in which said coil end portions extend outward circumferentially from said rectilinear portions that are housed in said slots that are in adjacent layers are opposite directions.

9. The stator for a rotary electric machine according to claim 7, wherein in coil ends that are formed by said coil end portions that extend outward circumferentially from said rectilinear portions that are housed in said slots:

a first insulating paper is disposed between coil end portions in which directions in which said coil end portions extend outward circumferentially from said rectilinear portions that are housed in said slots that are in adjacent layers are opposite directions; and a second insulating paper that is thinner than said first insulating paper is disposed between coil end portions in which directions in which said coil end portions extend outward circumferentially from said rectilinear portions that are housed in said slots that are in adjacent layers are like directions.

\* \* \* \* \*